United States Patent
Mouilleseaux et al.

(10) Patent No.: US 9,459,791 B2
(45) Date of Patent: *Oct. 4, 2016

(54) RADIAL MENU SELECTION

(75) Inventors: Jean-Pierre M. Mouilleseaux, Venice, CA (US); Charles J. Migos, San Francisco, CA (US)

(73) Assignee: Apple Inc., Cupertino, CA (US)

(*) Notice: Subject to any disclaimer, the term of this patent is extended or adjusted under 35 U.S.C. 154(b) by 1122 days.

This patent is subject to a terminal disclaimer.

(21) Appl. No.: 13/544,919

(22) Filed: Jul. 9, 2012

(65) Prior Publication Data

US 2012/0278762 A1    Nov. 1, 2012

Related U.S. Application Data

(63) Continuation of application No. 12/164,032, filed on Jun. 28, 2008, now Pat. No. 8,245,156.

(51) Int. Cl.
*G06F 3/048*    (2013.01)
*G06F 3/0488*    (2013.01)
*G06F 3/0482*    (2013.01)

(52) U.S. Cl.
CPC ......... *G06F 3/04883* (2013.01); *G06F 3/0482* (2013.01)

(58) Field of Classification Search
CPC ............. G06F 3/04812; G06F 3/0482; G06F 3/04883
USPC ........................................ 715/705, 834, 856
See application file for complete search history.

(56) References Cited

U.S. PATENT DOCUMENTS

| | | |
|---|---|---|
| 5,590,219 A | 12/1996 | Gourdol |
| 5,596,347 A | 1/1997 | Robertson et al. |
| 5,598,183 A | 1/1997 | Robertson et al. |
| 5,642,131 A | 6/1997 | Pekelney et al. |
| 5,721,853 A | 2/1998 | Smith |
| 5,745,715 A | 4/1998 | Pickover et al. |
| 5,805,167 A | 9/1998 | van Cruyningen |
| 5,828,360 A | 10/1998 | Anderson et al. |
| 5,883,625 A | 3/1999 | Crawford et al. |
| 5,916,178 A | 6/1999 | Noone et al. |
| 5,926,178 A | 7/1999 | Kurtenbach |

(Continued)

FOREIGN PATENT DOCUMENTS

| | | |
|---|---|---|
| AU | 2010254344 | 5/2010 |
| CN | 1818844 A | 8/2006 |

(Continued)

OTHER PUBLICATIONS

"U.S. Appl. No. 12/164,032, 312 Amendment filed Jun. 25, 2012", 10 pgs.

(Continued)

*Primary Examiner* — Andrey Belousov
(74) *Attorney, Agent, or Firm* — Schwegman Lundberg & Woessner, P.A.

(57) ABSTRACT

A method comprising of displaying a GUI object is disclosed. The method displays a first graphical user interface (GUI) object with multiple selectable GUI items. The method detects a movement of a cursor in a direction of a particular selectable GUI item. The method determines an expected location for the stopping of the cursor. The method displays, at the expected location, a second GUI object corresponding to the particular GUI item.

32 Claims, 30 Drawing Sheets

(56) References Cited

U.S. PATENT DOCUMENTS

| | | | |
|---|---|---|---|
| 5,969,708 A | 10/1999 | Walls | |
| 5,999,895 A | 12/1999 | Forest | |
| 6,028,600 A | 2/2000 | Rosin et al. | |
| 6,219,056 B1 | 4/2001 | Felser et al. | |
| 6,362,842 B1* | 3/2002 | Tahara | G06F 3/04812 715/705 |
| 6,448,987 B1 | 9/2002 | Easty et al. | |
| 6,538,635 B1 | 3/2003 | Ringot | |
| 6,549,219 B2 | 4/2003 | Selker | |
| 6,883,143 B2 | 4/2005 | Driskell | |
| 7,350,158 B2 | 3/2008 | Yamaguchi et al. | |
| 7,487,467 B1 | 2/2009 | Kawahara et al. | |
| 7,516,419 B2 | 4/2009 | Petro et al. | |
| 7,634,740 B2 | 12/2009 | Enomoto et al. | |
| 7,644,372 B2 | 1/2010 | Russo | |
| 7,661,075 B2 | 2/2010 | Lahdesmaki | |
| 7,676,763 B2 | 3/2010 | Rummel | |
| 7,730,425 B2 | 6/2010 | de los Reyes et al. | |
| 8,245,156 B2 | 8/2012 | Mouilleseaux et al. | |
| 8,347,226 B2 | 1/2013 | Windl | |
| 8,549,432 B2 | 10/2013 | Warner | |
| 8,578,294 B2 | 11/2013 | Eom et al. | |
| 2001/0019338 A1 | 9/2001 | Roth | |
| 2003/0174172 A1 | 9/2003 | Conrad et al. | |
| 2004/0196267 A1 | 10/2004 | Kawai et al. | |
| 2004/0221243 A1 | 11/2004 | Twerdahl et al. | |
| 2005/0044509 A1 | 2/2005 | Hunleth et al. | |
| 2005/0223339 A1 | 10/2005 | Lee | |
| 2005/0229116 A1 | 10/2005 | Endler et al. | |
| 2005/0278647 A1 | 12/2005 | Leavitt et al. | |
| 2006/0232551 A1 | 10/2006 | Matta | |
| 2006/0248475 A1 | 11/2006 | Abrahamsson | |
| 2007/0008300 A1 | 1/2007 | Yang et al. | |
| 2007/0180392 A1 | 8/2007 | Russo | |
| 2007/0198949 A1 | 8/2007 | Rummel | |
| 2007/0234223 A1 | 10/2007 | Leavitt et al. | |
| 2007/0250793 A1 | 10/2007 | Miura et al. | |
| 2007/0271528 A1 | 11/2007 | Park et al. | |
| 2008/0015841 A1 | 1/2008 | Longe et al. | |
| 2008/0222569 A1 | 9/2008 | Champion et al. | |
| 2008/0229245 A1* | 9/2008 | Ulerich | G06F 3/0482 715/834 |
| 2008/0252597 A1 | 10/2008 | Heynen et al. | |
| 2009/0037813 A1 | 2/2009 | Newmann et al. | |
| 2009/0043195 A1 | 2/2009 | Poland | |
| 2009/0172596 A1 | 7/2009 | Yamashita | |
| 2009/0187860 A1 | 7/2009 | Fleck et al. | |
| 2009/0327955 A1 | 12/2009 | Mouilleseaux et al. | |
| 2009/0327963 A1 | 12/2009 | Mouilleseaux et al. | |
| 2009/0327964 A1 | 12/2009 | Mouilleseaux et al. | |
| 2010/0192103 A1 | 7/2010 | Cragun et al. | |
| 2010/0281430 A1 | 11/2010 | Safar | |
| 2010/0306702 A1 | 12/2010 | Warner | |
| 2014/0082557 A1 | 3/2014 | Warner | |

FOREIGN PATENT DOCUMENTS

| | | |
|---|---|---|
| CN | 102449588 A | 5/2012 |
| EP | 1585320 A2 | 10/2005 |
| EP | 2435900 | 4/2012 |
| KR | 10-2007-0006477 A | 1/2007 |
| WO | WO 2009/158549 | 12/2009 |
| WO | WO 2010/138360 | 12/2010 |

OTHER PUBLICATIONS

"U.S. Appl. No. 12/164,032, Examiner Interview Summary mailed Jan. 23, 2012", 3 pgs.

"U.S. Appl. No. 12/164,032, Final Office Action mailed Nov. 8, 2011", 16 pgs.

"U.S. Appl. No. 12/164,032, Non Final Office Action mailed May 13, 2011", 13 pgs.

"U.S. Appl. No. 12/164,032, Notice of Allowance mailed Mar. 29, 2012", 15 pgs.

"U.S. Appl. No. 12/164,032, Preliminary Amendment filed Mar. 20, 2009", 3 pgs.

"U.S. Appl. No. 12/164,032, Response filed Feb. 8, 2012 to Final Office Action mailed Nov. 8, 2011", 15 pgs.

"U.S. Appl. No. 12/164,032, Response filed Aug. 15, 2011 to Non Final Office Action mailed May 13, 2011", 15 pgs.

"U.S. Appl. No. 12/164,033, Advisory Action mailed Jan. 15, 2013", 2 pgs.

"U.S. Appl. No. 12/164,033, Final Office Action mailed Oct. 25, 2012", 15 pgs.

"U.S. Appl. No. 12/164,033, Non Final Office Action mailed Jan. 5, 2012", 13 pgs.

"U.S. Appl. No. 12/164,033, Non Final Office Action mailed Apr. 17, 2012", 13 pgs.

"U.S. Appl. No. 12/164,033, Preliminary Amendment filed Mar. 20, 2009", 3 pgs.

"U.S. Appl. No. 12/164,033, Response filed Jul. 17, 2012 to Non Final Office Action mailed Apr. 17, 2012", 14 pgs.

"U.S. Appl. No. 12/164,033, Response filed Sep. 26, 2011 to Restriction Requirement mailed Sep. 2, 2011", 9 pgs.

"U.S. Appl. No. 12/164,033, Response filed Dec. 26, 2012 to Final Office Action mailed Oct. 25, 2012", 13 pgs.

"U.S. Appl. No. 12/164,033, Restriction Requirement mailed Sep. 2, 2011", 7 pgs.

"U.S. Appl. No. 12/164,035, Examiner Interview Summary mailed Sep. 28, 2011", 3 pgs.

"U.S. Appl. No. 12/164,035, Examiner Interview Summary mailed May 16, 2012", 3 pgs.

"U.S. Appl. No. 12/164,035, Final Office Action mailed Feb. 10, 2012", 15 pgs.

"U.S. Appl. No. 12/164,035, Non Final Office Action mailed Apr. 2, 2013", 16 pgs.

"U.S. Appl. No. 12/164,035, Non Final Office Action mailed Oct. 31, 2011", 9 pgs.

"U.S. Appl. No. 12/164,035, Preliminary Amendment filed Mar. 20, 2009", 3 pgs.

"U.S. Appl. No. 12/164,035, Response filed Jan. 31, 2012 to Non Final Office Action mailed Oct. 31, 2011", 13 pgs.

"U.S. Appl. No. 12/164,035, Response filed May 10, 2012 to Final Office Action nailed Feb. 10, 2012", 16 pgs.

"U.S. Appl. No. 12/164,035, Response filed Oct. 3, 2011 to Restriction Requirement Sep. 2, 2011", 7 pgs.

"U.S. Appl. No. 12/164,035, Restriction Requirement mailed Sep. 2, 2011", 6 pgs.

"U.S. Appl. No. 12/475,470, Decision on Pre-Appeal Brief Request mailed Feb. 10, 2012", 2 pgs.

"U.S. Appl. No. 12/475,470, Examiner Interview Summary mailed Dec. 22, 2011", 3 pgs.

"U.S. Appl. No. 12/475,470, Final Office Action mailed Oct. 26, 2011", 32 pgs.

"U.S. Appl. No. 12/475,470, Non Final Office Action mailed May 4, 2011", 21 pgs.

"U.S. Appl. No. 12/475,470, Non Final Office Action mailed May 31, 2012", 28 pgs.

"U.S. Appl. No. 12/475,470, Non Final Office Action mailed Dec. 7, 2012", 28 pgs.

"U.S. Appl. No. 12/475,470, Notice of Allowance mailed May 30, 2013", 11 pgs.

"U.S. Appl. No. 12/475,470, Preliminary Amendment filed Sep. 9, 2009", 4 pgs.

"U.S. Appl. No. 12/475,470, Response Filed Mar. 7, 2013 to Non-Final Office Action mailed Dec. 7, 2012", 16 pgs.

"U.S. Appl. No. 12/475,470, Response filed Aug. 2, 2012 to Non Final Office Action mailed May 31, 2012", 24 pgs.

"U.S. Appl. No. 12/475,470, Response filed Aug. 4, 2011 to Non Final Office Action mailed May 4, 2011", 18 pgs.

Mouilleseaux, J.-P. M., et al., "Selecting Menu Items", U.S. Appl. No. 12/164,035, filed Jun. 28, 2008, 89 pgs.

Portions of prosecution history of U.S. Appl. No. 12/164,032, Jul. 13, 2012, Mouilleseaux, Jean-Pierre M., et al.

Portions of prosecution history of U.S. Appl. No. 12/164,033, Jul. 17, 2012, Mouilleseaux, Jean-Pierre M., et al.

(56) References Cited

OTHER PUBLICATIONS

Portions of prosecution history of U.S. Appl. No. 12/164,035, May 16, 2012, Mouilleseaux, Jean-Pierre M., et al.
Portions of prosecution history of U.S. Appl. No. 12/475,470, May 31, 2012, Warner, Peter.
Portions of prosecution history of EP 10720701, Jul. 2, 2012, Apple Inc.
Partial International Search Report for PCT/US2009/048732, Sep. 30, 2010 (mailing date), Apple Inc.
International Search Report and Written Opinion for PCT/US2009/048732, Dec. 27, 2010 (mailing date), Apple Inc.
International Preliminary Report on Patentability for PCT/US2009/048732, Jan. 11, 2011 (date of issuance), Apple Inc.
International Search Report and Written Opinion for PCT/US2010/035472, Nov. 9, 2010 (mailing date), Apple Inc.
International Preliminary Report on Patentability and Written Opinion for PCT/US2010/035472, Nov. 29, 2011 (date of issuance), Apple Inc.
Author Unknown, "Mobile/UI/Designs/TouchScreen/Proposal5", Mozilla Wiki, last modified on Mar. 23, 2008, 8 pages, https://wiki.mozilla.org/Mobile/UI/Designs/TouchScreen/Proposal5.
U.S. Appl. No. 14/042,545, filed Sep. 30, 2013 Radial Menus.
U.S. Appl. No. 12/164,035, filed Jun. 28, 2008 Selecting Menu Items.
"U.S. Appl. No. 12/164,033, Non Final Office Action mailed Aug. 15, 2013", 13 pgs.
"U.S. Appl. No. 12/475,470, Applicant's Summary of Examiner Interview filed Jan. 26, 2012", 2 pgs.
"U.S. Appl. No. 14/042,545, Non Final Office Action mailed Jan. 25, 2016", 15 pgs.
"U.S. Appl. No. 14/042,545, Preliminary Amendment filed Feb. 16, 2015", 7 pgs.
"U.S. Appl. No. 14/042,545, Response filed Apr. 7, 2016 to Non Final Office Action mailed Jan. 25, 2016", 10 pgs.
"U.S. Appl. No. 14/042,545, Preliminary Amendment filed Oct. 31, 2013", 7 pgs.
"U.S. Appl. No. 14/042,545, Third Party Submission filed Apr. 10, 2014", 7 pgs.
"Australian Application Serial No. 2010254344, Notice of Acceptance mailed Sep. 25, 2013", 2 pgs.
"Australian Application Serial No. 2010254344, Response filed Sep. 13, 2013 to Second Examiners Report mailed Jul. 18, 2013", 3 pgs.
"Australian Application Serial No. 2010254344, Response filed Jul. 10, 2013 to First Examiner Report mailed Nov. 28, 2012", 16 pgs.
"Australian Application Serial No. 2010254344, Subsequent Examiners Report mailed Jul. 18, 2013", 3 pgs.
"Australian Application Serial No. 2014200055, Response filed Feb. 17, 2016 to Subsequent Examiners Report mailed Oct. 12, 2015", 20 pgs.
"Australian Application Serial No. 2014200055, Response filed Mar. 8, 2016 to Subsequent Examiners Report mailed Feb. 25, 2016", 16 pgs.
"Australian Application Serial No. 2014200055, Response filed Mar. 24, 2016 to Subsequent Examiners Report mailed Mar. 15, 2016", W/ English Translation, 19 pgs.
"Australian Application Serial No. 2014200055, Subsequent Examiners Report mailed Feb. 25, 2016", 3 pgs.
"Australian Application Serial No. 2014200055, Subsequent Examiners Report mailed Mar. 15, 2016", 4 pgs.
"Australian Application Serial No. 2014200055, Subsequent Examiners Report mailed Apr. 5, 2016", 3 pgs.
"Australian Application Serial No. 2014200055, Subsequent Examiners Report mailed Oct. 12, 2015", 4 pgs.
"Australian Application Serial No. 2014200055,First Examiner's Report mailed Apr. 2, 2015", 3 pgs.
"Australian Serial No. 2010254344, First Examiner Report mailed Nov. 28, 2012", 3 pgs.
"Chinese Application Serial No. 201080023455.5, Notice of Reexamination mailed Oct. 10, 2014", (w/ English Translation), 37 pgs.
"Chinese Application Serial No. 201080023455.5, Office Action mailed Apr. 17, 2013", w/ English Translation), 17 pgs.
"Chinese Application Serial No. 201080023455.5, Office Action mailed Oct. 12, 2013", (w/ English Translation), 30 pgs.
"Chinese Application Serial No. 201080023455.5, Response filed Aug. 27, 2013 to Office Action mailed Apr. 17, 2013", 25 pgs.
"Chinese Application Serial No. 201080023455.5, Response filed Dec. 19, 2013 to Office Action mailed Oct. 12, 2013", (w/ English Translation of Pending Claims), 17 pgs.
"European Application Serial No. 10720701.1, Decision to Refuse mailed Jun. 6, 2014", 17 pgs.
"European Application Serial No. 10720701.1, Examination Notification Art. 94(3) mailed May 8, 2013", 4 pgs.
"European Application Serial No. 10720701.1, Examination Notification Art. 94(3) mailed Sep. 16, 2013", 4 pgs.
"European Application Serial No. 10720701.1, Non Final Office Action mailed Jul. 3, 2012", 1 pg.
"European Application Serial No. 10720701.1, Office Action mailed Jan. 5, 2012", 2 pgs.
"European Application Serial No. 10720701.1, Response filed Jan. 15, 2014 to Office Action mailed Sep. 16, 2013", 5 pgs.
"European Application Serial No. 10720701.1, Response filed Jul. 2, 2012 to Office Action mailed Jan. 5, 2012", 4 pgs.
"European Application Serial No. 10720701.1, Response filed Sep. 3, 2013 to Office Action mailed May 8, 2013", 9 pgs.
"European Application Serial No. 10720701.1, Summons to Attend Oral Proceedings mailed Feb. 7, 2014", 7 pgs.
"European Application Serial No. 10720701.1, Written Submissions filed Apr. 17, 2014 in response to Summons mailed Feb. 7, 2014", 14 pgs.
"International Application Serial No. PCT/US2010/035472, Letter filed Jan. 5, 2011 Requesting Amendment Under Article 19", 7 pgs.
"International Application Serial No. PCT/US2010/035472, Letter Requesting Amendment filed Jan. 5, 2011 in Response to International Search Report mailed Nov. 9, 2010", 6 pgs.
"Korean Application Serial No. 10-2011-7028354, Office Action mailed May 27, 2013", (w/ English Translation), 8 pgs.
"Korean Application Serial No. 10-2011-7028354, Response filed Aug. 27, 2013 to Office Action mailed May 27, 2013", (w/ English Translation of Claims), 37 pgs.
"Korean Application Serial No. 10-2011-7028354, Voluntary Amendment filed Nov. 28, 2011", w/ English Translation 18 pgs.
Mouilleseaux, J. P. M., "Moving Radial Menus", U.S. Appl. No. 12/164,033, filed Jun. 28, 2008, 91 pgs.
Mouilleseaux, J.-P. M., et al., "Radial Menu Selection", U.S. Appl. No. 12/164,032, filed Jun. 28, 2008, 89 pgs.
Nicholls, Stu, "A circular Menu with submenus", stu nicholls-cssplay.co.uk, [online] Retrieved From Internet: <http://www.cssplay.co.uk/menus/circular-sub.html>, (Nov. 19, 2008), 6 pgs.

* cited by examiner

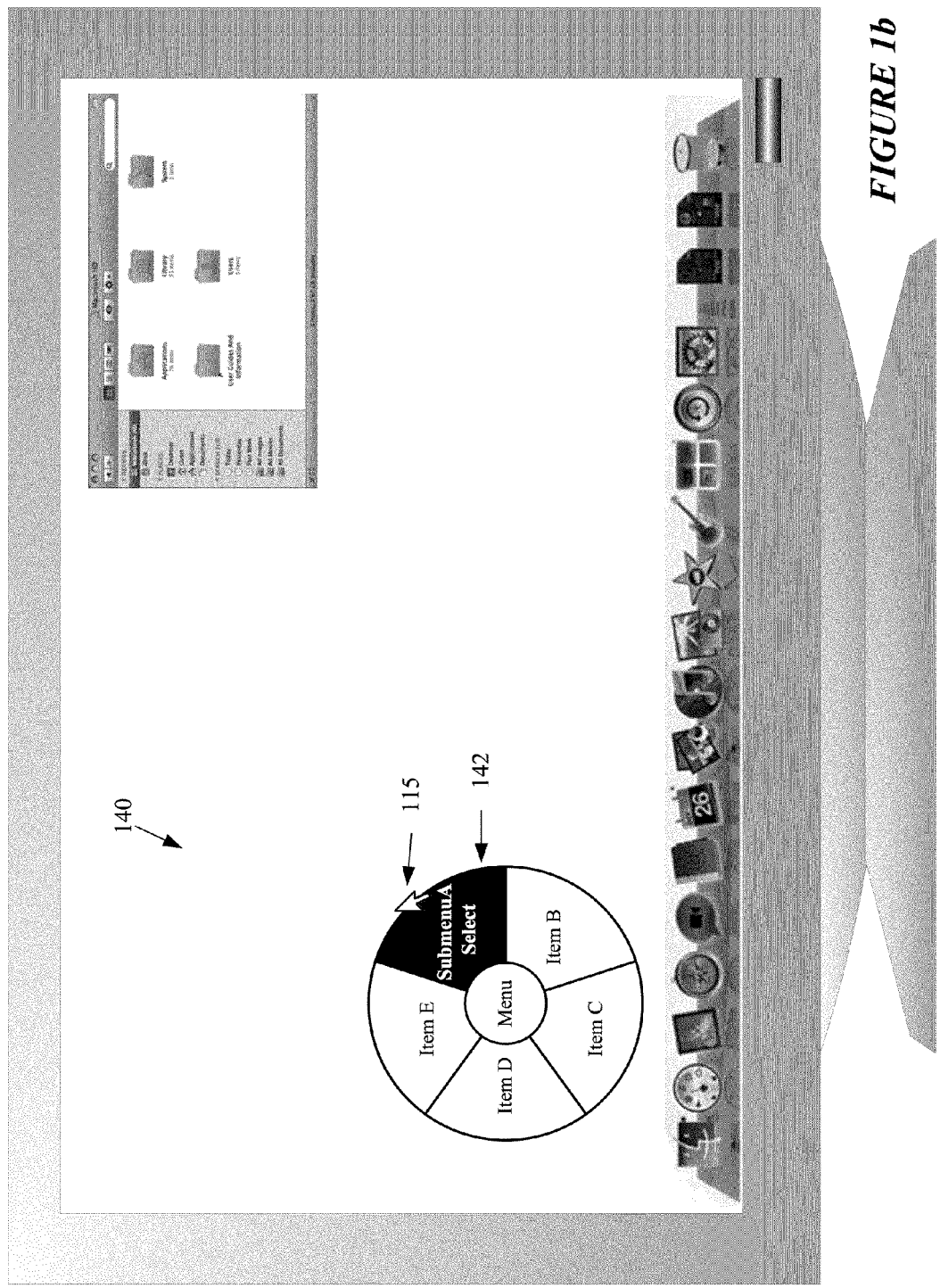

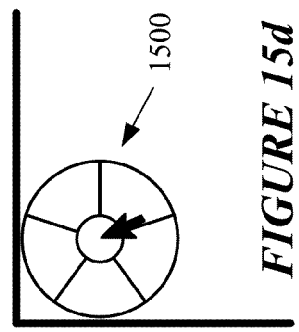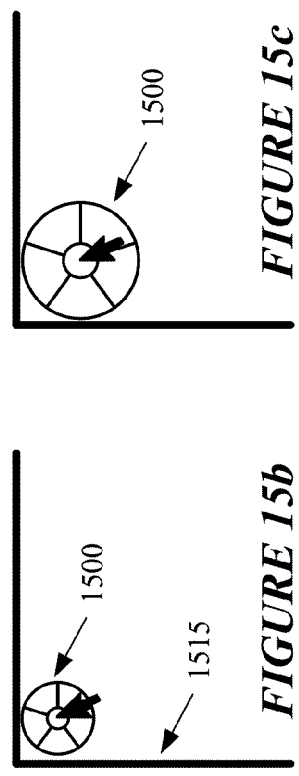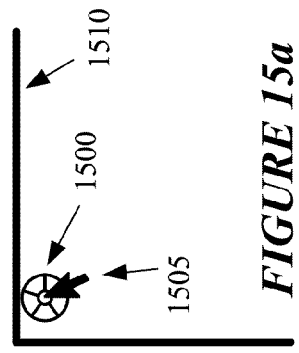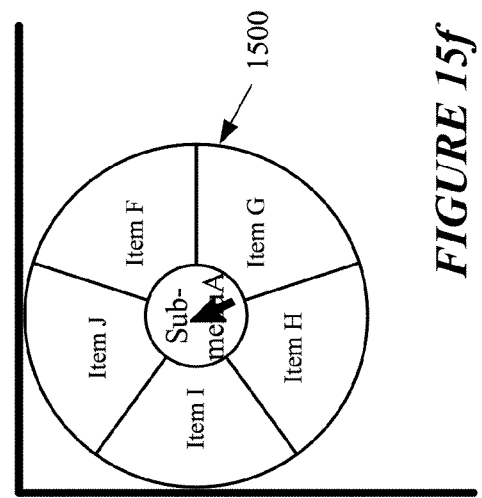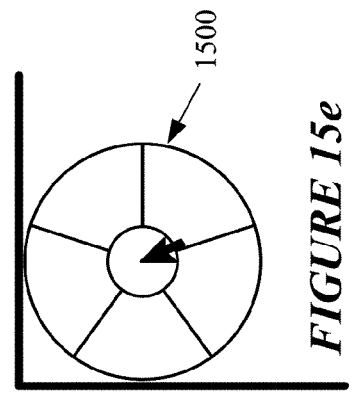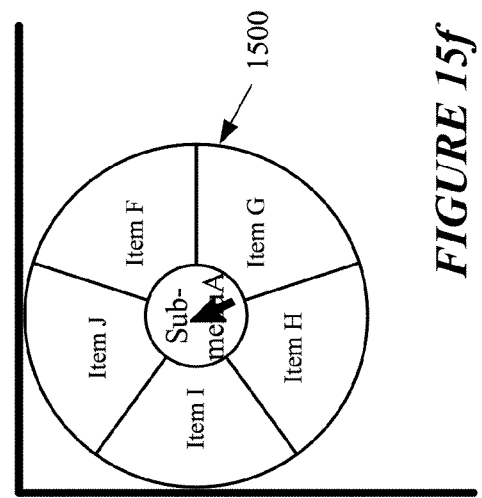

RADIAL MENU SELECTION

CLAIM OF BENEFIT TO PRIOR APPLICATIONS

This Application is a continuation application of U.S. patent application Ser. No. 12/164,032, filed Jun. 28, 2008 now U.S. Pat. No. 8,245,156, now published as U.S. Publication 2009/0327963. U.S. Publication 2009/0327963 is incorporated herein by reference.

FIELD OF THE INVENTION

The invention is directed toward providing radial menus in computer applications. Specifically, this invention is directed toward providing menus and submenus at optimal locations relative to a cursor.

BACKGROUND OF THE INVENTION

User interfaces of computing devices often provide multiple options for actions under any given set of circumstances. For example, a user interface might provide options to change the font of selected text, change paragraph spacing of a document, load, print, or save a file, etc.

The most common method of presenting such options in a graphical user interface is to provide a linear pull-down menu. That is, a menu including a row of menu items that give access to columns of submenus. In a linear pull-down menu a user selects a general category from a provided list of menu items, such as File, Edit, View, Window, Help, etc. These broad categories are sometimes called "top level menu items" because in a hierarchal tree of menus, they would be the items at top of the tree. Some top level menu items allow access to submenus related to the selected item. For example, selecting a top level menu item "File" can activate the item, causing a submenu to appear with selectable commands relating to files. The submenu would appear as a column of the options, leading down from the "File" menu item. A submenu for "File" might include "Save", "Load", or "Print" commands. Some items on submenus might have submenus of their own, and so on for any number of levels of submenus.

Linear pull-down menus are often located at or near the top of a screen or window in which an application is running. Accessing such a linear pull-down menu via a cursor control device involves moving a cursor to the top of the window with the cursor control device, then moving along to the appropriate top level menu item, activating a submenu (if necessary), etc. Using a cursor to select items on a linear pull-down menu requires a user to move the cursor by a particular distance down the menu to reach the desired menu item. This can require moving a cursor through a considerable distance and with considerable precision required to reach the desired menu item without going past it.

An alternate method of presenting a menu of options uses a radial menu. A radial menu can appear as a set of wedges, each wedge representing a menu item, around the location of a cursor on the display. Submenus of some radial menus are activated by moving a cursor to the wedge representing that submenu and clicking on that wedge. Such a method is sometimes called "hunt and click". The hunt and click method provided a fully functional menu, and there was no obvious reason to modify it. However, useful and non-obvious changes to the methods of providing radial menus were possible, such as using other processes for selecting menus, or providing a user with options for more than one method. Accordingly, the present invention provides such useful, non-obvious changes.

SUMMARY OF THE INVENTION

Some embodiments provide a graphical user interface (GUI) that displays GUI objects (e.g., display areas) with numerous novel features. The GUI objects include multiple selectable items in some embodiments. In some embodiments, the GUI objects (e.g., menus) are radial GUI objects that have the multiple selectable items arranged around an internal location of the radial GUI object (e.g. a geometric center of the GUI object or an off-center point such as a focus of an elliptical GUI object).

Some embodiments display additional GUI objects in response to the selection of particular selectable items in a first GUI object. In some embodiments, the selectable items can be selected with various cursor operations, including sweep gestures, spring-loading, and other operations. A sweep gesture in some embodiments is an outward movement of the cursor towards a selectable item. When a selectable item of a first GUI object is selected with a cursor operation, some embodiments display a corresponding second GUI object at a location determined by the characteristics of the cursor operation. For example, when the cursor operation is a sweep gesture, some embodiments display the second GUI object at a location where the cursor is predicted to stop.

As mentioned above, various embodiments provide a radial GUI object with multiple selectable items. Different embodiments provide different techniques for selecting and activating the selectable items. For instance, in some embodiments, a user selection of one of the selectable items of the radial GUI objects causes an automatic activation of the item (e.g., a sweeping gesture towards an item causes a selection and activation of the item in some embodiments. In some embodiments, a user selects an item through a first user input operation and then activates the item through a second user input operation. Some such embodiments select successive items in response to the rotation of a scrollwheel and activate a selected item in response to a signal (e.g., a cursor control signal or a keyboard signal). Some embodiments allow a user to perform similar selection operations by making gestures on a trackpad or other touch sensitive cursor control device (e.g., placing two fingers on the device and rotating the fingers).

The GUI objects of some embodiments are menus with selectable menu items. The menu items correspond to menu commands. In some embodiments, a menu is a structural hierarchy of commands grouped by category. The hierarchical menu structure of some embodiments includes multiple levels of submenus accessible by sequential activations of menu commands to open successive submenus. Each submenu is a menu that is accessible by activating a menu command at a higher level of the hierarchy. Some embodiments activate menu items based on the sweep gestures described in section II. In addition, some embodiments activate menu items in response to other operations. For example, some embodiments activate a menu item when a cursor is placed over the menu item and remains over that menu item for a predetermined duration. Some embodiments accept selections of menu items through multiple different operations.

When a menu (or submenu) of some embodiments is accessed, the menu is displayed at an initial location determined by characteristics of an activation operation that opened that menu (e.g., the characteristics of a sweep operation). In some cases, the initial location is near the edge of the screen or a particular window such that the menu cannot be fully displayed. When the initial location does not allow the menu to fully display, some embodiments display the menu at a second location such that the entire menu is fully displayed within the particular window or on the screen. Different embodiments use different processes to determine the second location and how the menu reaches the second location (e.g., initially displaying the menu at the second location or initially displaying the menu at the initial location and sliding the menu to the second location). In some embodiments, when a menu (or submenu) is displayed, whether at the initial location or after being moved to a second location, the cursor is automatically moved to a point within the menu (e.g., the center of the menu).

BRIEF DESCRIPTION OF THE DRAWINGS

The novel features of the invention are set forth in the appended claims. However, for purpose of explanation, several embodiments of the invention are set forth in the following figures.

FIGS. 1a-1c illustrate radial menus and submenus activated by sweeps.

FIGS. 15a-15f illustrate a submenu starting off small and expanding against first one, then two edges.

DETAILED DESCRIPTION OF THE INVENTION

Figure 1A:
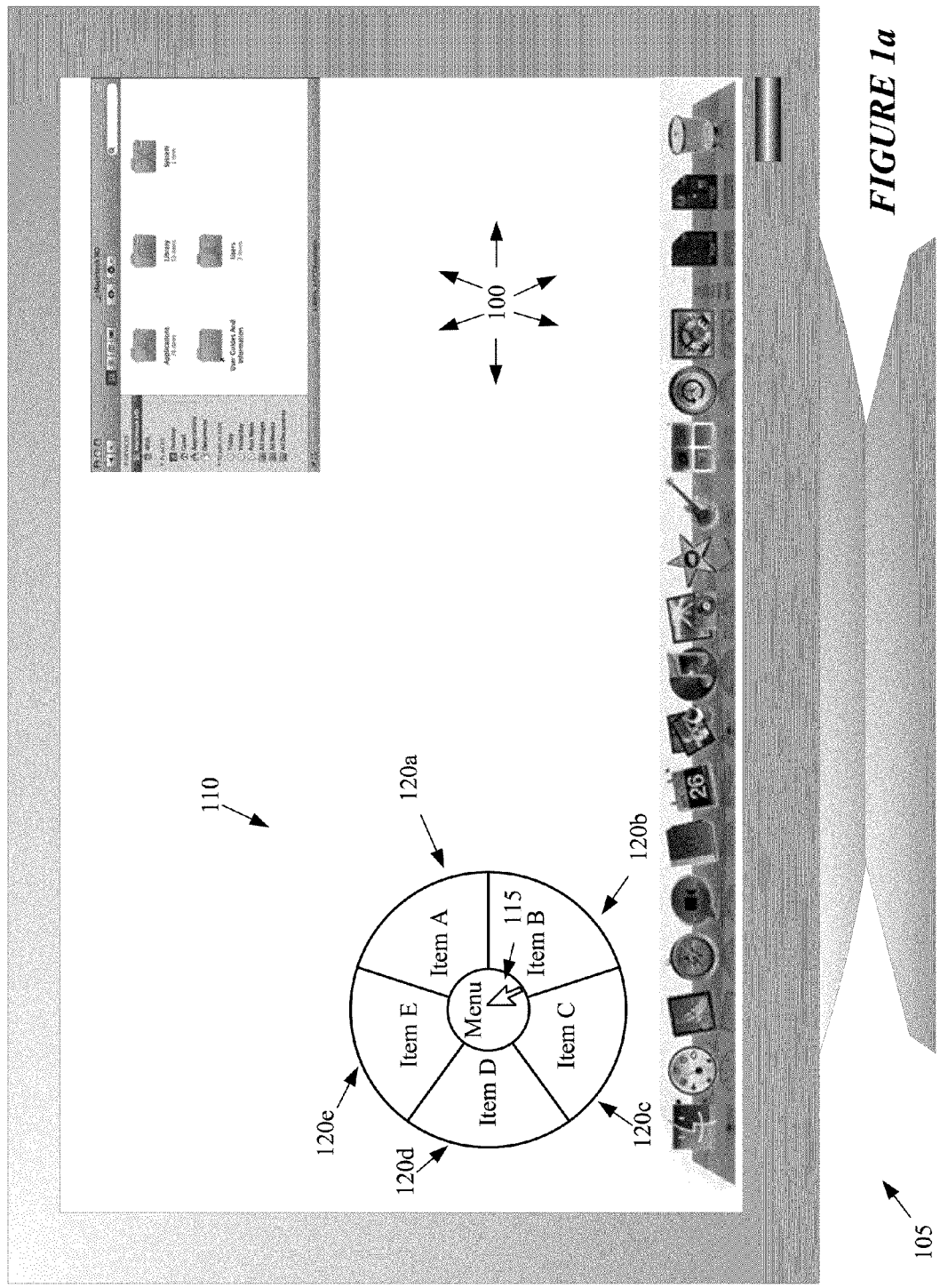

In the following description, numerous details are set forth for purpose of explanation. However, one of ordinary skill in the art will realize that the invention may be practiced without the use of these specific details. For instance, the techniques described below are described with relation to certain cursor control devices, but other embodiments may use other cursor control devices while still embodying the current invention.

I. Overview

Some embodiments provide a graphical user interface (GUI) that displays GUI objects (e.g., display areas) with numerous novel features. The GUI objects include multiple selectable items in some embodiments. In some embodiments, the GUI objects (e.g., menus) are radial GUI objects that have the multiple selectable items arranged around an internal location of the radial GUI object (e.g. a geometric center of the GUI object or an off-center point such as a focus of an elliptical GUI object).

Some embodiments display additional GUI objects in response to the selection of particular selectable items in a first GUI object. In some embodiments, the selectable items can be selected with various cursor operations, including sweep gestures, spring-loading, and other operations. A sweep gesture in some embodiments is an outward movement of the cursor towards a selectable item. When a selectable item of a first GUI object is selected with a cursor operation, some embodiments display a corresponding second GUI object at a location determined by the characteristics of the cursor operation. For example, when the cursor operation is a sweep gesture, some embodiments display the second GUI object at a location where the cursor is predicted to stop.

As mentioned above, various embodiments provide a radial GUI object with multiple selectable items. Different embodiments provide different techniques for selecting and activating the selectable items. For instance, in some embodiments, a user selection of one of the selectable items of the radial GUI objects causes an automatic activation of the item (e.g., a sweeping gesture towards an item causes a selection and activation of the item in some embodiments. In some embodiments, a user selects an item through a first user input operation and then activates the item through a second user input operation. Some such embodiments select successive items in response to the rotation of a scrollwheel and activate a selected item in response to a signal (e.g., a cursor control signal or a keyboard signal). Some embodiments allow a user to perform similar selection operations by making gestures on a trackpad or other touch sensitive cursor control device (e.g., placing two fingers on the device and rotating the fingers).

The GUI objects of some embodiments are menus with selectable menu items. The menu items correspond to menu commands. In some embodiments, a menu is a structural hierarchy of commands grouped by category. The hierarchical menu structure of some embodiments includes multiple levels of submenus accessible by sequential activations of menu commands to open successive submenus. Each submenu is a menu that is accessible by activating a menu command at a higher level of the hierarchy. Some embodiments activate menu items based on the sweep gestures described in section II. In addition, some embodiments activate menu items in response to other operations. For example, some embodiments activate a menu item when a cursor is placed over the menu item and remains over that menu item for a predetermined duration. Some embodiments accept selections of menu items through multiple different operations.

When a menu (or submenu) of some embodiments is accessed, the menu is displayed at an initial location determined by characteristics of an activation operation that opened that menu (e.g., the characteristics of a sweep operation). In some cases, the initial location is near the edge of the screen or a particular window such that the menu cannot be fully displayed. When the initial location does not allow the menu to fully display, some embodiments display the menu at a second location such that the entire menu is fully displayed within the particular window or on the screen. Different embodiments use different processes to determine the second location and how the menu reaches the second location (e.g., initially displaying the menu at the second location or initially displaying the menu at the initial location and sliding the menu to the second location). In some embodiments, when a menu (or submenu) is displayed, whether at the initial location or after being moved to a second location, the cursor is automatically moved to a point within the menu (e.g., the center of the menu).

In this specification, a variety of embodiments are illustrated and described in relation to circular radial menus (or submenus). However, other embodiments provide other GUI objects (e.g., file folder selection objects) with features described herein. Furthermore, radial GUI objects need not be circular. The radial GUI objects of some embodiments can be any GUI objects that include multiple selectable items arranged about an internal location.

FIG. 1a illustrates an example of a graphical user interface ("GUI") 100 that provides radial menus. This figure illustrates the GUI 100 of an operating system that is being displayed on a display 105. As further shown in this figure, the GUI is displaying a radial menu 110. This radial menu 110 appears in the GUI around a cursor 115. The radial menu 110 might have been opened at that location by any number of GUI operations. In some embodiments, the GUI will display a menu around a cursor when a user activates a cursor control device (e.g., by pressing, or pressing and releasing, a button on a mouse, tapping a finger on a touchpad, etc.).

Figure 1C:
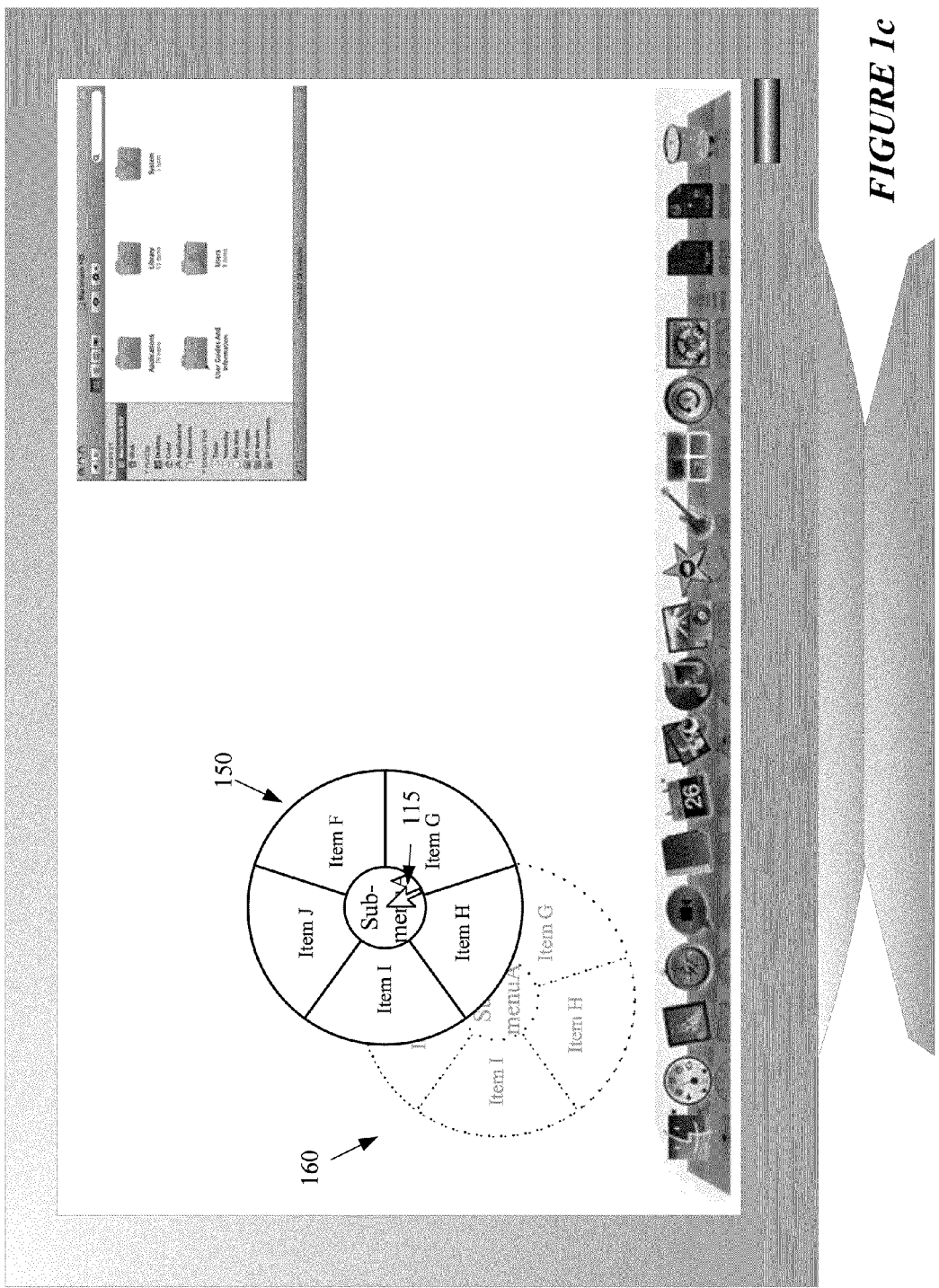

As also shown in FIG. 1a, the menu contains a number of selectable menu items 120a-120e. Some embodiments allow the selection of menu items 120a-120e based on simple cursor movements (e.g., gestures). One example of this is illustrated in FIGS. 1b and 1c. FIG. 1b shows that cursor 115 has swept through a submenu select item 142. As shown in the figure, the sweep gesture has caused a selection of submenu select item 142, denoted here by the inversion of the background and text colors of the submenu select item 142.

FIG. 1c shows that, as a result of the sweep gesture across submenu select item 142 (as numbered in FIG. 1b), the menu item 142 has been automatically activated, causing the submenu 150 to be displayed (being displayed is sometimes referred to as "popping up") surrounding the location of cursor 115 at the end of the sweep. The submenu of the illustrated embodiment does not open up at the location of the beginning of the sweep (e.g., the location of menu 110), denoted here by faded submenu 160.

Figure 2:
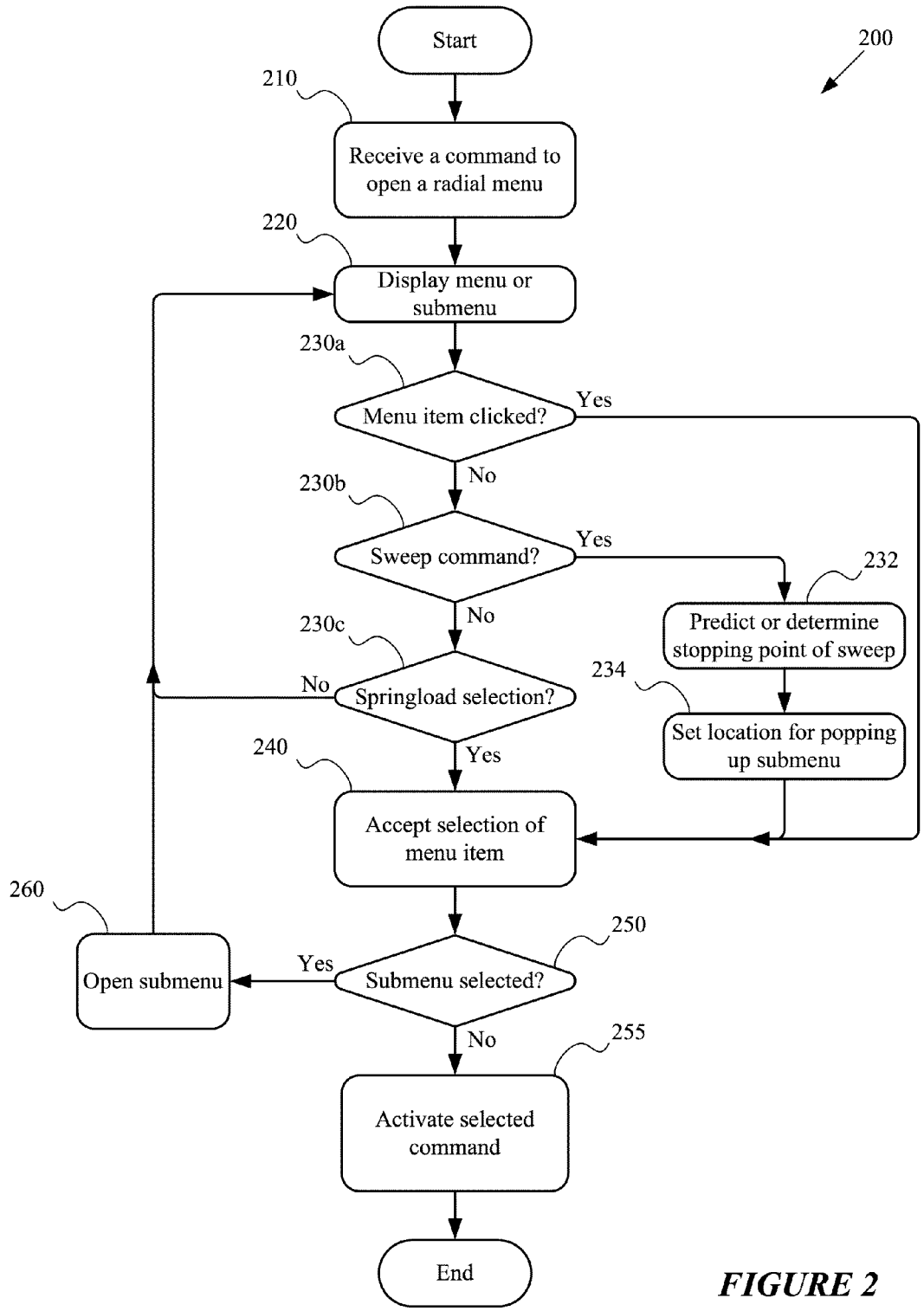
FIG. 2 illustrates the process of some embodiments of using cursor commands to activate menu items.

In some embodiments, a single application provides options for a user to use multiple ways to activate menu items of radial menus. For example, sweep, hunt and click, and spring-load commands, further described below, can all be used by some embodiments. In fact, in some embodiments, multiple processes may be used in one set of submenu selections, for example, a sweep command could open a first submenu and then a spring-load command could open a submenu of the first submenu. FIG. 2 illustrates the process 200 of some embodiments for receiving commands to select a menu item or submenu item and displaying submenus. In some embodiments, an application implementing the process 200 receives the commands from the cursor control device.

The process 200 begins when it receives (at 210) a command to open a menu, e.g., a click (or click and hold) command from a cursor controller. In response to the command, the process 200 displays (at 220) a radial menu. In some embodiments the radial menu appears around the cursor. The process 200 keeps displaying the menu (at 220) until it receives a cursor command to select a radial menu item by a click (at 230a), a sweep (at 230b), or a spring-load selection (at 230c). If the command is a sweep command, then the process predicts (at 232) the stopping point of the sweep and sets (at 234) the location for displaying a submenu. Some embodiments allow a spring-load selection of an item to be made by keeping a cursor in one place on the menu item until a preset time has passed and also allow a user to press a keyboard key (e.g., a spacebar) to make the springboard selection before the preset time has passed.

Once a cursor command is sent by a user, the process 200 accepts the selection of a menu item (at 240). If (at 250) the selected menu item is not a submenu, then the process automatically activates the selected menu item and performs (at 255) the selected menu command (e.g., print). If the selected menu item does represent a submenu, then the application opens (at 260) the submenu. If the command that selected the submenu is a sweep command, then the submenu will be opened at or near the location where the cursor stops moving. Various embodiments use various methods to achieve this result, e.g., waiting until the cursor stops, or predicting where the cursor will stop and displaying the submenu at the predicted location. Such embodiments are further described in section II below. Other embodiments automatically move the cursor to a location where the submenu is displayed, as further described in section III, below.

Once a submenu is opened, the process 200 loops back (to 220) and displays the menu until it receives further commands (at 230a-230c). As the figure shows, a user can use a different type of command on the submenu than on the original menu (e.g., sweep the menu item to open the submenu then click on a menu item of the submenu). Unless interrupted by a canceling command (e.g., the "ESC" key being pressed or the cursor being moved to the center of a menu or submenu), the process 200 continues until a menu item that is not a submenu is selected (at 240), at which point the command is performed.

Figure 3:
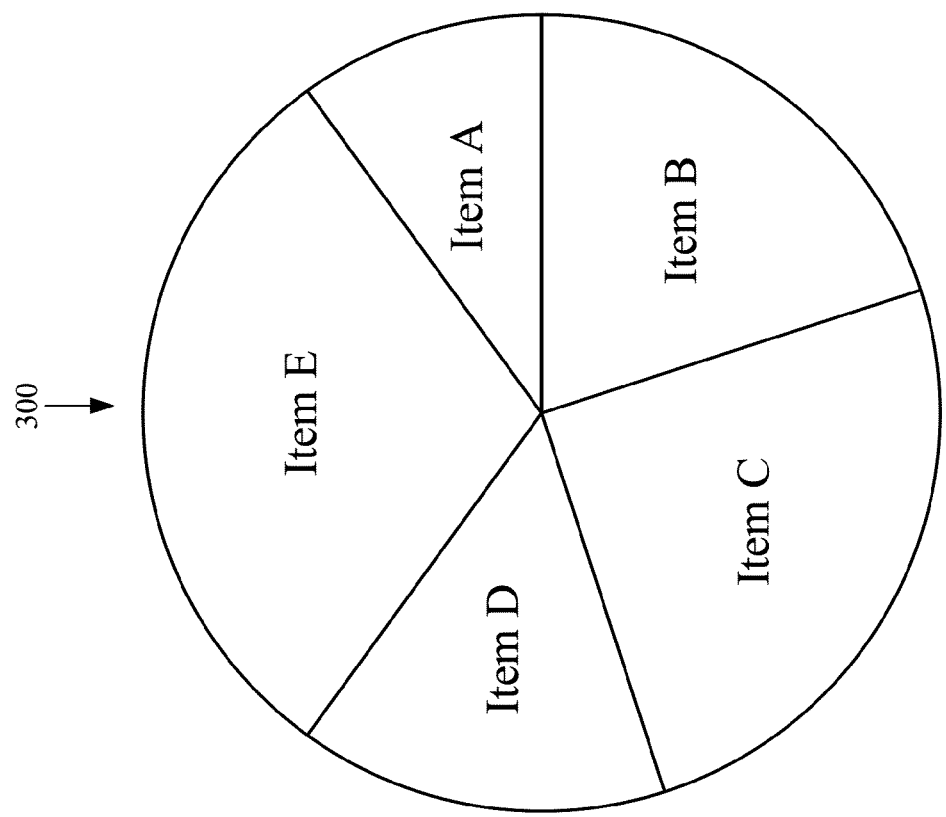
FIG. 3 illustrates a radial menu with unequal sized menu items.

The radial menus shown above (as well as many of the menus illustrated below) are all circular radial menus with menu items of equal size that do not extend to the center of the menu. However, many other types of radial menus are possible within the scope of the invention. For instance, in some embodiments, sections or wedges of a radial menu extend to the center of the menu. The menus of some embodiments have menu items that do not have identical angular width. For example, a frequently used menu item could be made larger than an infrequently used menu item. In some embodiments a user deliberately chooses to change the size of the menu items, while in some embodiments, a programmer sets the sizes in anticipation of which options will be most frequently used. In other embodiments, the sizes of the menu items change dynamically as the system learns which options the user favors. FIG. 3 illustrates a menu 300 of some embodiments with unequally sized menu items.

In addition to radial menus, the features described herein can be applied to other GUI objects having other shapes. For example, in some embodiments, the selectable items of a radial GUI object can be arbitrarily shaped and arbitrarily arranged around an internal location that is within the radial GUI object. The internal location is the geometric center of the selectable items in some embodiments or is a focal point of the selectable items in other embodiments. In some embodiments, the internal location is simply a location with at least one selectable item on either side of the location. The internal location could be far from the geometric center in some embodiments. For example, the internal location could be at one focus of a long elliptical GUI object.

Some embodiments have radial menus with menu items that overlap and/or menus in which two menu items can be intersected by a single ray from the internal location about which the objects are arranged. However, in some embodiments, radial menus (or other radial GUI objects with selectable items) have no possible ray from the internal location that could intersect more than one selectable item of the GUI object. In other words, every selectable item is in a different direction relative to the internal location.

In some embodiments, such as the embodiments illustrated in FIGS. 1*a*-1*c* (described above), the selectable items of the GUI object are contiguous (each menu item of the illustrated menu touches the menu item next to it). In some other embodiments, some or all of the selectable items (e.g., menu items) are not contiguous (e.g., there are small gaps between the selectable items of some embodiments). The radial GUI objects of some embodiments are divided into a number of selectable items with geometric shapes. In some embodiments, the geometrically shaped selectable items are the only selectable items in the GUI object. In some embodiments, the selectable items are arranged next to each other to produce the overall shape of the GUI object. While some of the embodiments illustrated above and below show GUI objects as part of an operating system, in some embodiments, the GUI objects are part of computer applications (e.g., computer programs such as video compositing software). Radial GUI objects are used as file folder structures or other GUI objects with selectable items in some embodiments. In some such embodiments, features described herein as applying to menus are applied to file folder structures. For example, some embodiments provide a radial file folder structure that has folders and files as selectable items in the same way that some embodiments have menus and submenus as selectable items. In some such embodiments, an initial radial file folder structure displays individual drives of a computer system.

When a drive is selected from such an initial radial file folder structure of some embodiments, the folders and files of the root directory of that drive are displayed (e.g., as another radial GUI object). Likewise, when a folder of the root directory is selected, the contents of that folder are displayed (e.g., as yet another radial GUI object). Some embodiments group folders and files when a selected folder has more files and/or subfolders than a radial GUI object can display clearly. That is, these embodiments subdivide the groups into separate selectable objects, and selecting one of the objects brings up further subdivisions if the number of files and/or subfolders is still too great. In some such embodiments, the contents of a folder are broken down alphabetically. For example, if there are one hundred folders and/or files in a directory, a GUI object could be displayed with six selectable items, each representing approximately sixteen files and/or subfolders in that folder. In some embodiments, a folder with a large number of subfolders and/or files is initially presented as a set of selectable items for files and a second set of selectable items for subfolders. In some embodiments that use radial file folder structures, the process of selecting subfolders continues until a file is selected.

II. Sweep Commands

In some embodiments, selectable items of a GUI object (e.g., menu items of a radial menu) can be selected by an outward motion of a cursor from an interior location of the radial menu. The outward motion of a cursor is sometimes called a sweep command. A sweep command occurs in some embodiments when a cursor control is activated, the cursor is moved while the control is still activated, and then the cursor control is deactivated (in some cases the cursor continues to move after the control is deactivated). For example, a sweep command to select a particular menu item could be performed by a user pressing and holding a mouse button, moving the cursor, and then releasing the button after the cursor has moved in a particular direction, with the direction that the cursor moves determining what menu item will be selected.

In some embodiments, the distance that the cursor moves during the sweep does not affect whether the sweep selects a menu item. In other embodiments, the sweep command selects a menu item by passing through the outer edge of the wedge corresponding to the menu item. Another way a sweep command could be performed is by a user touching a stylus to a touchpad and moving the stylus along the touch pad (so as to move the cursor through a menu item) before the stylus is lifted. In some embodiments, a sweep command is performed without activating a cursor control for an extended period of time: for example, a user in some embodiments could press and release a mouse button, then move the cursor through a menu item to perform a sweep command.

A. Selecting and Activating Menu Items with Sweep Commands

Figure 4:
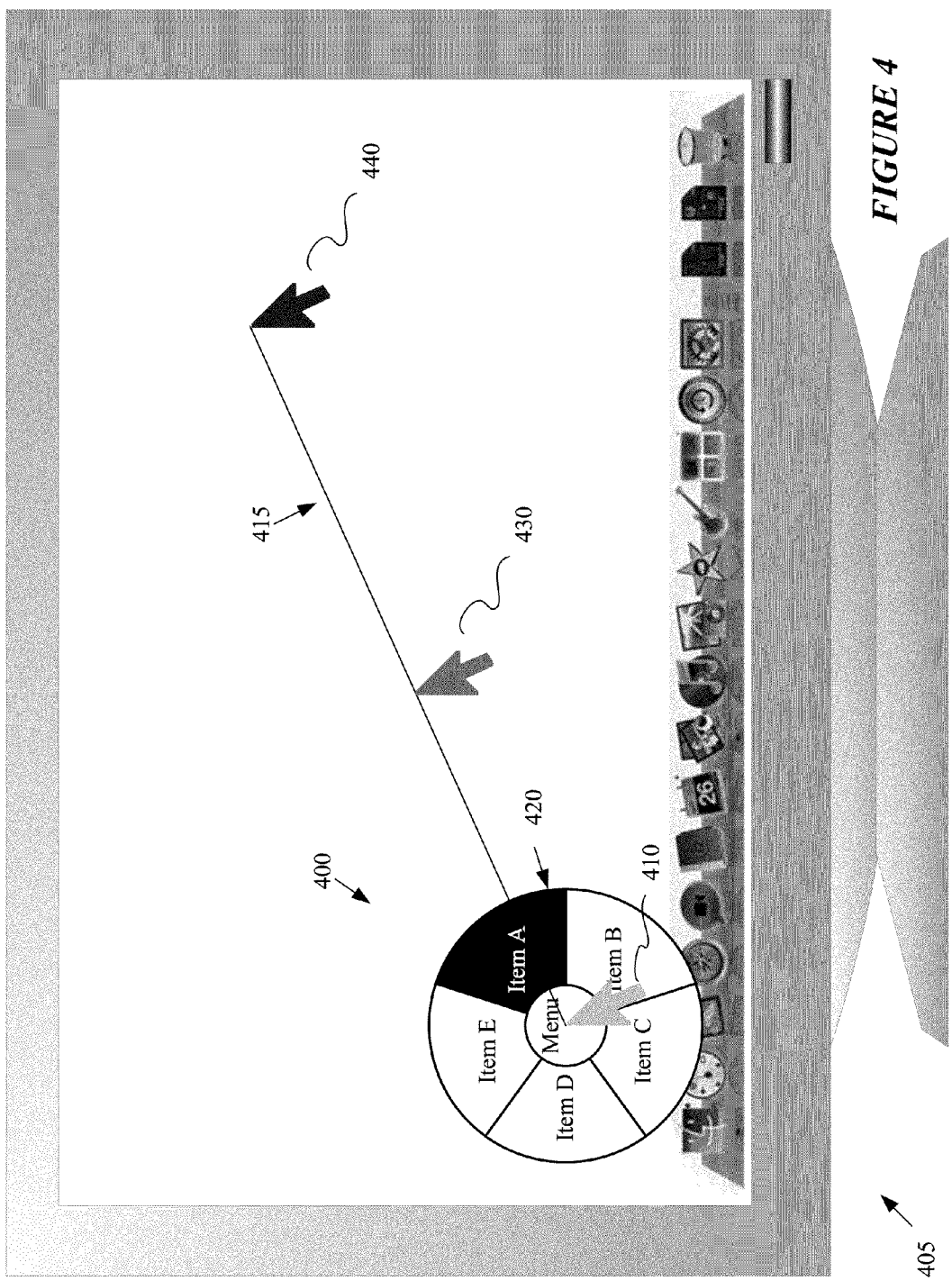
FIG. 4 illustrates an example of the motion of a cursor through a wedge of a radial menu during a sweep command.

FIG. 4 illustrates an example of the motion of a cursor through a wedge of a radial menu during a sweep operation of some embodiments. The figure illustrates radial menu 400 in display 405, faded cursor 410, line 415, menu item 420, faded cursor 430 and cursor 440. In this figure (and others), faded cursors are used to indicate the positions of the cursor at different times. That is, multiple cursors are shown, each with a different level of fading. The most faded cursor represents the location of the cursor at the earliest time, the next most faded represents the location of the cursor at the next earliest time, and so on.

In FIG. 4, the menu 400 of an application is displayed at the lower left corner of the display 405. The menu 400 surrounds a first (earliest) faded cursor 410 that represents the position where a user clicked (e.g., pushed a mouse button) to cause the menu 400 to be displayed. The cursor was then swept through a path represented by a line 415. One of ordinary skill in the art will realize that the line 415 itself is not part of the GUI of some embodiments, and is used in the figure to help depict motion in a still image, though some embodiments may implement such a line. The line 415 passes through the wedge corresponding to menu item 420, indicating that the cursor passed through that wedge, activating the menu item 420.

A second (later) faded cursor 430 shows the position where the click is released (e.g., a mouse button is released) after passing through wedge 420. The figure depicts an operation in which the cursor is still moving when the button is released. As shown, the cursor control device continues to command the cursor to move until it reaches a final location shown by a third (last) cursor 440. If the selected menu item corresponds to a submenu, then the corresponding submenu will be displayed. Where the submenu will be displayed depends on which embodiment of the current invention is implemented in the application, as further described in sections II.B. and III, below.

Figure 5:
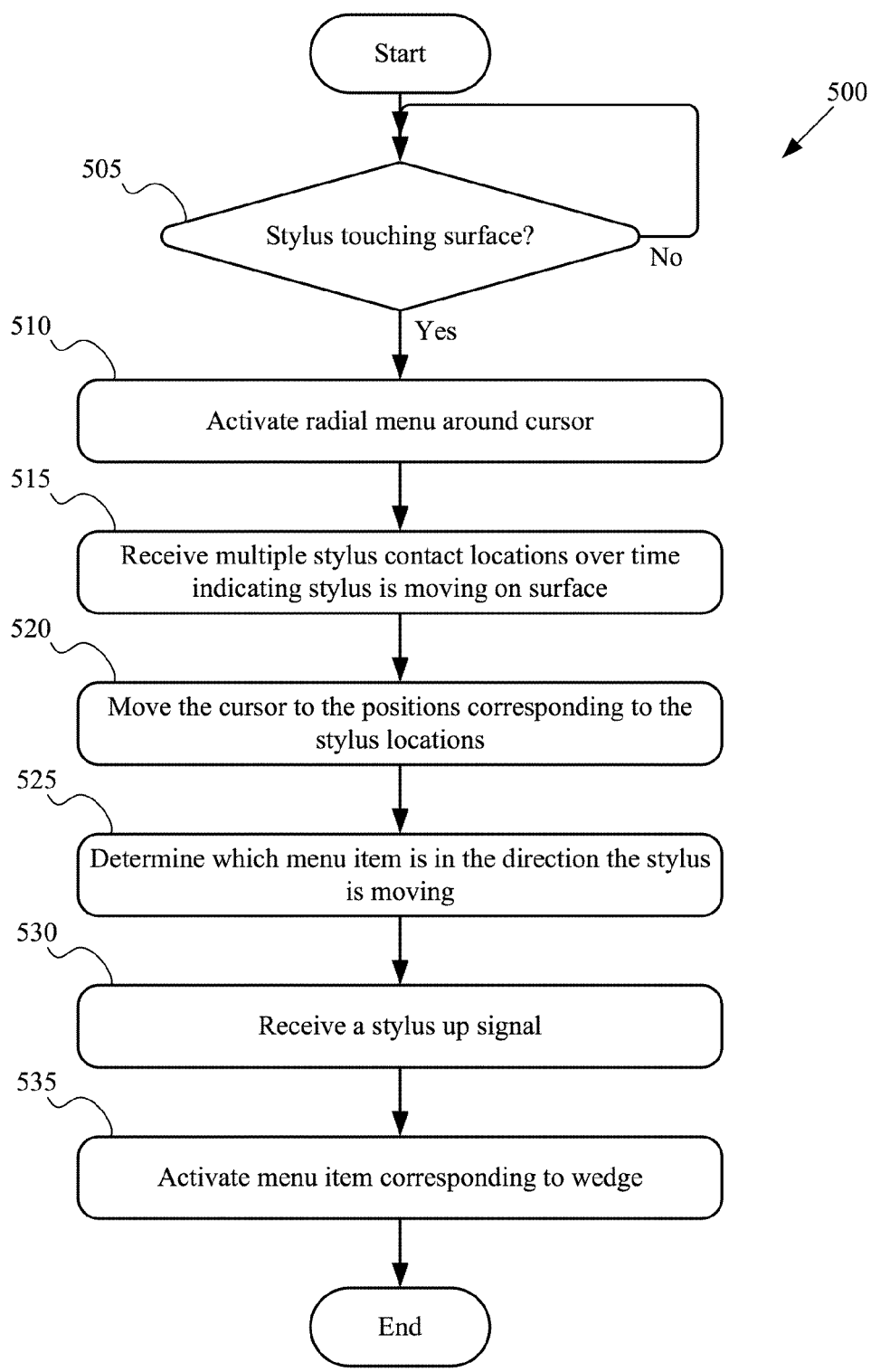
FIG. 5 illustrates a process for activating a menu item using a graphics tablet and stylus to perform a sweep command.

FIG. 5 illustrates the process 500 of some embodiments for activating a menu item with a sweep command using a graphics tablet or touch screen. The process 500 waits (at 505) for a stylus to touch the surface of the tablet. Once the contact has been made, the process 500 displays a radial menu (at 510) around the cursor that appears at the location on the display corresponding to the place where the stylus touched the tablet.

The process 500 receives (at 515) multiple signals from the tablet. These signals include information identifying the location of the stylus at various times. The process 500 moves the cursor (at 520) to positions corresponding to the positions of the stylus.

Some embodiments have the range of angles corresponding to each wedge preprogrammed into the application (or determines these angles in other ways, such as user feedback), and determine a selected wedge based on the angle at which the tablet-controlled cursor moves away from the center of the menu. As a stylus may not necessarily be moved in a straight line by a user, some embodiments determine the angle of movement based on the angle of a line from the center of the menu to a point through which the cursor is moved. For example, a menu might have four menu items, corresponding to angle ranges of 0-90°, 90-180°, 180-270°, and 270-360°. The presently described embodiments can detect the stylus down at the center of the menu, and can then determine the angle at which the stylus is moved (and thus the angle at which the cursor moves). Once the angle of the cursor's movement is known, the process (at 525) has all the necessary data to determine which menu wedge the stylus has selected. For example, if the cursor moves at an 80° angle from the center, then the menu item corresponding to the angle range of 0-90° is selected.

Other embodiments determine which menu wedge a user is selecting based on where the cursor crosses an outer edge of a wedge. The wedge whose outer edge the cursor passes through is deemed the selected wedge. The position of the outer edges of the menu wedges of the radial menu, relative to the center of the menu, is preprogrammed into the application of some embodiments and then can be dynamically determined once the position of the center of the menu is identified. The position of the outer edges of the menu wedges relative to the center of the menu can also be determined by factoring user preferences as to the size of the menu. Accordingly, once the position of the center of the menu is known, the process (at 525) has all the necessary data to determine when a tablet controlled cursor crosses through an outer edge of a wedge (e.g., when the cursor is just outside an edge very soon after being just inside the edge).

In some embodiments, a wedge or section of a radial menu can be selected by sweeping the cursor through the inner edge of the wedge. In other such embodiments, a wedge is selected when the cursor is swept through both the inner and outer edges of the wedge. In some such embodiments, moving the cursor through the inner edge of one wedge and the outer edge of another wedge aborts the menu item selection process.

The process 500 receives a stylus up signal (at 530) indicating that the stylus has been removed from the surface of the tablet. One of ordinary skill in the art will realize that in some embodiments the stylus up signal will come earlier or later in the process and that in some embodiments, rather than a stylus up signal, the process 500 will determine that the stylus has been removed from the surface of the tablet when it stops receiving a stylus down signal.

After the selected wedge has been determined, the process 500 automatically activates the menu item corresponding to that wedge (at 535). One of ordinary skill in the art will realize that in some embodiments, the menu item can be activated before the stylus up signal is received.

Figure 6:
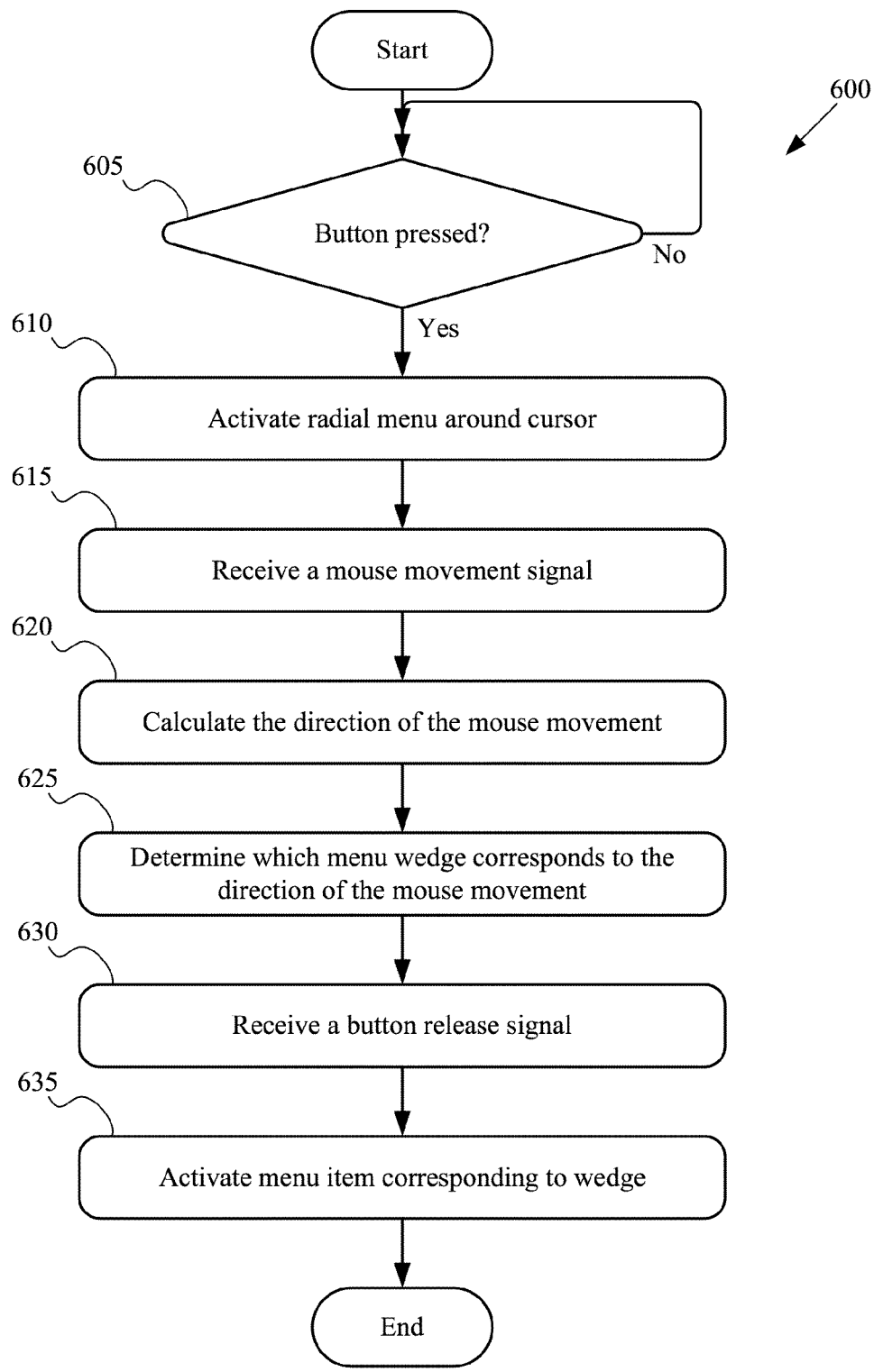
FIG. 6 illustrates a process for activating a menu item using a mouse controller to perform a sweep command.

Some embodiments use a process similar to the process shown in FIG. 5 to determine which menu item a user is selecting with a mouse instead of a graphics tablet or touch screen. FIG. 6 illustrates the process 600 of some embodiments for activating a menu item using a sweep command of a mouse controller. The process 600 waits (at 605) to receive a click-and-hold command from the mouse (e.g., the user has pressed a button on the mouse and is holding that button down). Once such a click has been received, the process 600 displays a radial menu (at 610) around the cursor.

The process 600 receives (at 615) signals from the mouse. In some embodiments, these signals include information identifying the distance the mouse has moved along an x and a y axis (of the mouse). In other embodiments, these signals include data that directly indicate the direction and speed of the mouse.

The process 600 calculates (at 620) the direction of the mouse movement from these signals. Because the mouse might move in the wrong direction for a very small distance (e.g., due to a slightly shaky hand) before making a larger movement in the direction the user intends, some embodiments determine the average direction of the mouse's movement during the time it is over the menu, rather than the direction of the mouse's movement at any given time. Some embodiments employ a noise compensation function to filter out the effects of minor movements.

The range of angles for each wedge of the radial menu is preprogrammed into the application of some embodiments. Accordingly, once the angle of the mouse's movement is known, the process (at 625) has all the necessary data to determine which wedge is indicated by the movement of the mouse (e.g., the wedge containing the angle at which the mouse is moving). In other embodiments, the process calculates the direction by determining which wedge the cursor is in when it passes through the outer edge of the menu. The process calculates which wedge the cursor passes through by determining the position of the outer edge of each menu wedge and then determining when the cursor passes through one of these positions.

The process 600 receives a button release signal (at 630). One of ordinary skill in the art will realize that in some embodiments the button release signal will come earlier or later in the process and that in some embodiments, rather than a button release signal, the process 600 will determine that the button has been released when it stops receiving a button hold signal.

After the button has been released and the selected wedge determined, the process 600 automatically activates the menu item corresponding to that wedge (at 635). One of ordinary skill in the art will realize that in some embodiments, the menu item can be activated before the button release signal is received.

In some embodiments, a submenu will be displayed as soon as the cursor stops moving, regardless of whether the button has been released. In other embodiments, a submenu will not be displayed until after a button is released, even if the cursor stops moving before the button is released.

Figure 7:
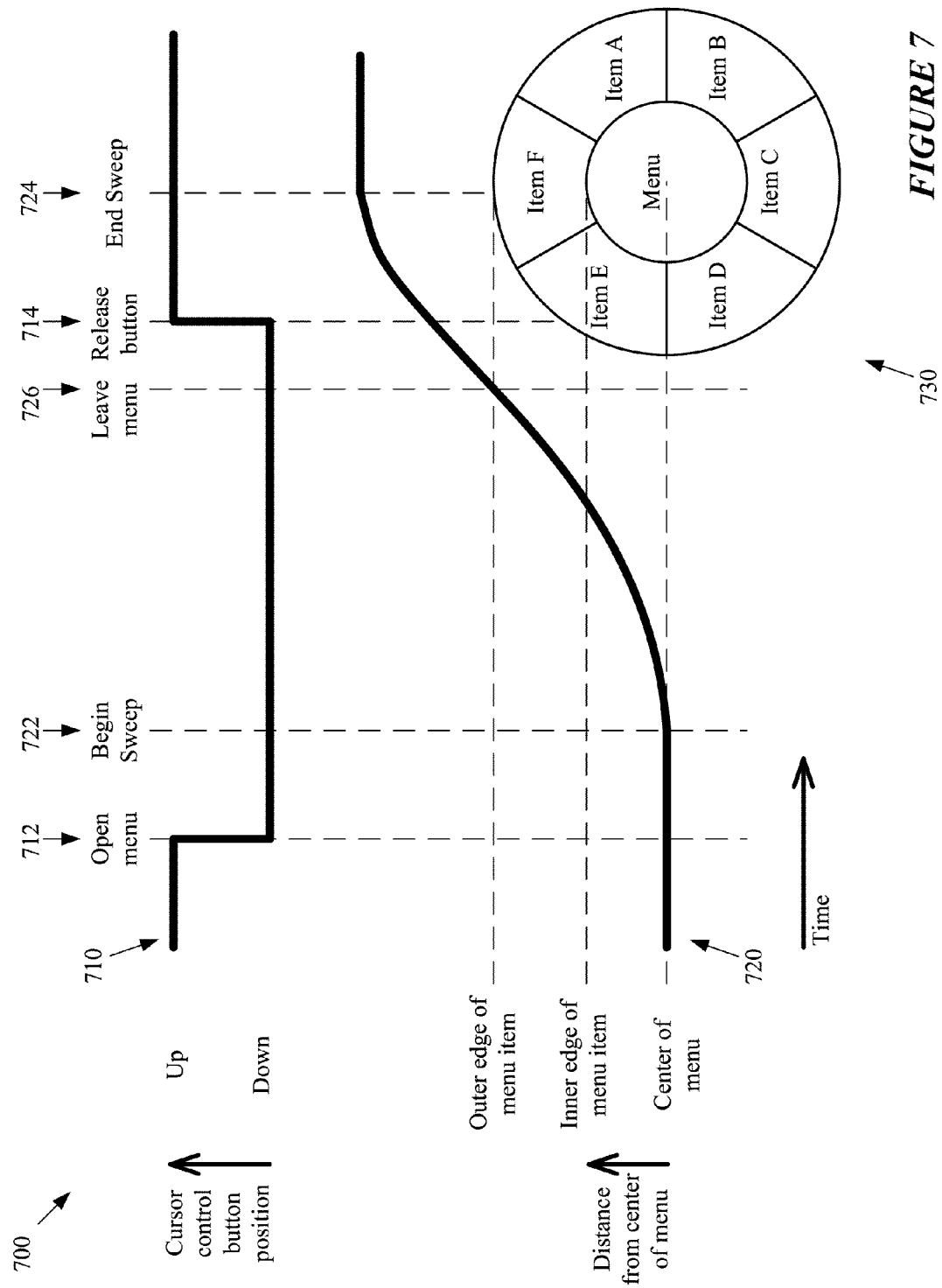
FIG. 7 illustrates a timing diagram for a sweep command.

FIG. 7 illustrates a timing diagram 700 for selecting a radial menu item by a sweep command. The timing diagram 700 includes button setting line 710 that identifies the actions of a cursor control button (or equivalent control such as a stylus on a graphics tablet) and cursor position line 720 that identifies the movement of the cursor commanded by the cursor control device. Line 710 shows a press of the button to open a menu at time 712, after the button is pressed it is held down. Line 720 shows that while the button is held down, the cursor controller begins to command the cursor to sweep through a menu item, starting at time 722 and ending at time 724. At time 726, the cursor passes through the outer edge of the menu 730. The fact that the sweep can end outside of the menu contrasts with the click within the edges of a menu used to select a menu item in a hunt and click command. At time 714, the cursor control button is released. In some embodiments, if a submenu is selected by a sweep command, then the submenu will be displayed at the time that the cursor control button is released, though not necessarily at the location that the control button is released. At time 724, the cursor stops moving and the sweep is complete.

Though the sweep in FIG. 7 is shown as ending after the cursor button is released, if a sweep that selects a submenu ends before the button is released (or a stylus is lifted), then in some embodiments, the submenu will be displayed around the cursor once it stops. In some embodiments, multiple sweeps can be performed to open multiple layers of submenus before the cursor control button is released (or stylus is lifted). Such multiple sweeps could be characterized, in some embodiments, as press-drag-release. That is, pressing a button, dragging the cursor in the direction of multiple menu items of multiple menus in sequence, and releasing the button.

FIG. 7 shows the position of the cursor relative to the center of the menu. The position shown is relative to Item F, however, any menu item could be selected using a sweep in a direction corresponding to that menu item. Different embodiments determine the direction of the sweep command in various ways. For example, an embodiment using a mouse to control the cursor could compare the distance that the mouse moved along an x-direction with the distance that the mouse moves along a y-direction and use trigonometry (e.g., an arctangent function) to determine the angle at which the mouse is moving. Once the application determines the angle along which the mouse is moving and the range of angles that each of the wedges occupy, the application can determine which wedge the user is selecting by determining which wedge contains the angle at which the mouse is moving. In other embodiments, a driver, or computer hardware determines the angle along which the mouse is moving and passes that determination on to the application. Determinations of the angles for various cursor control devices are further described in section VI.

In some embodiments, a user can return to a previous level of a menu hierarchy by returning the cursor to the center of a menu (or submenu) after sweeping. For example, if a user moves a mouse the wrong way during a sweep command, the user can use the mouse to return the cursor to the center of the immediately preceding menu before releasing the button. Similarly, in some embodiments, by clicking on the center of a submenu, or leaving the cursor there without moving (a spring-load command, further described in section IV below) the user can re-open the previous menu.

B. Predicting Stopping Location of Sweep Commands

Figure 8:
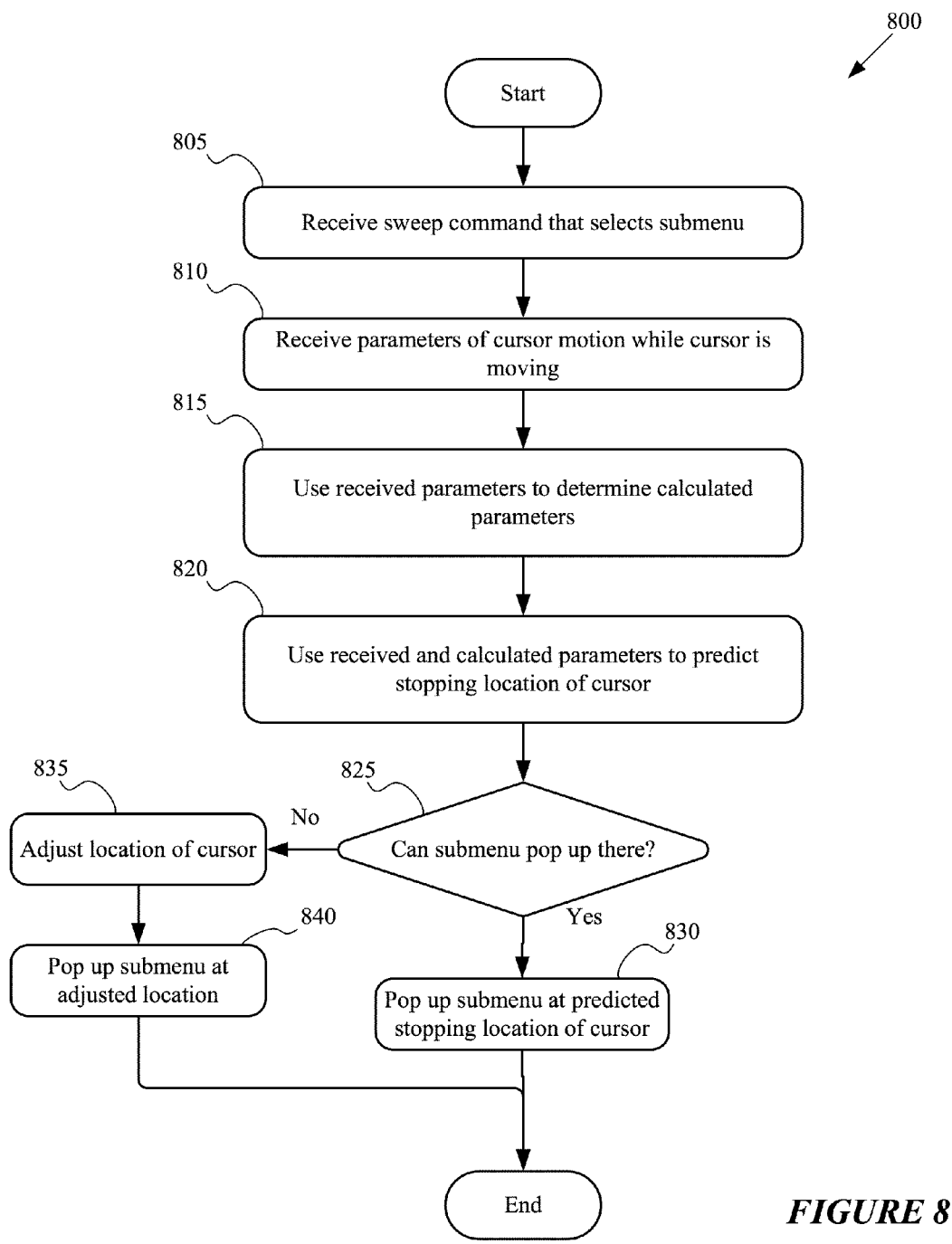
FIG. 8 illustrates a process for predicting where a submenu will be displayed after a sweep.

Some embodiments, after receiving a sweep command, determine where to display a submenu opened by the sweep command. Some embodiments display the submenu at a predicted stopping location of the cursor. FIG. 8 illustrates a process 800 for predicting where a cursor will stop after a sweep command. The process 800 receives (at 805) a sweep command that selects a submenu. The process 800 receives (at 810) parameters of the cursor motion while the cursor is still moving (while still performing the sweep command). Which parameters are received depends on what type of cursor control device is used. For example, if a mouse is used, the velocity (or a relative change in location at different times) is received. In contrast, if a graphics tablet is used, the absolute locations of the stylus on the pad are received. In some embodiments, the received parameters are used (at 815) to calculate other parameters. For example, different velocities of the cursor at different times can be used to calculate the acceleration of the cursor. Likewise, different locations of the cursor at different times can be used to calculate the velocity of the cursor.

Once the parameters are received and calculated, the application uses (at 820) the received and calculated parameters to predict the stopping location of the cursor. For example, the expected stopping location of the cursor could be predicted using the location, speed, acceleration, and/or jolt of the cursor when the cursor control device is deactivated (e.g., when a mouse button is released). In some embodiments, the information could be used directly in equations of motion (e.g., stopping distance equals one-half times speed squared divided by acceleration). In some embodiments, the information could be used in an algorithm developed by the programmers that doesn't strictly apply the equations of motion. For example, an algorithm derived from tests of stopping points in actual use of cursor control devices could be used.

Some embodiments use a learning algorithm to predict the stopping point of a cursor based on the stopping points of cursors moved by the user or users of that application in the past. For example, when a user is controlling the cursor with a mouse, the system can determine where the cursor actually stops for multiple sweep commands under a given set of parameters (e.g., position, velocity, etc). The system can then use that information to refine the predictions of where the cursor will stop given similar parameters in the future. Similarly, some tablets can determine where a stylus is when the stylus is near the surface of the tablet, even when the stylus is not actually touching the surface. In such embodiments, the position of the cursor continues to be directly controlled by the position of the stylus, even after the stylus is lifted from the pad. Accordingly, the system can collect data about actual stopping locations of the stylus under given sets of parameters (speed, acceleration, etc.) at the time that the stylus is lifted from the pad. The data about past stopping locations can be used to predict where the stylus will stop in the future, under various sets of parameters (speed, acceleration etc.).

If (at 825) the predicted or actual stopping location is far enough from the edge of the screen for a submenu to be displayed, then the submenu will display (at 830) at that location. If (at 825) the predicted or actual stopping location is too close to the edge of the screen for a submenu to be fully displayed then the process 800 adjusts (at 835) the location of the cursor to somewhere within the screen where the submenu has room to be displayed. Then (at 840), the application will display the submenu at the adjusted location. Some embodiments provide a combination of the prediction and actual stopping position, with the application initially displaying the submenu at an initially predicted location and then moving it to the location where the cursor actually stops. In some embodiments, the application may continuously update the prediction and move the submenu to the newly predicted locations as the cursor comes to a stop. Other embodiments monitor the speed and/or acceleration of the cursor and display the menu as soon as the cursor speed drops below a low-speed threshold. In some such embodiments, the low-speed threshold is combined with a timeout such that the low speed will trigger a menu when some set amount of time has passed (either since the slow speed began or since the sweep command began).

Figure 9:
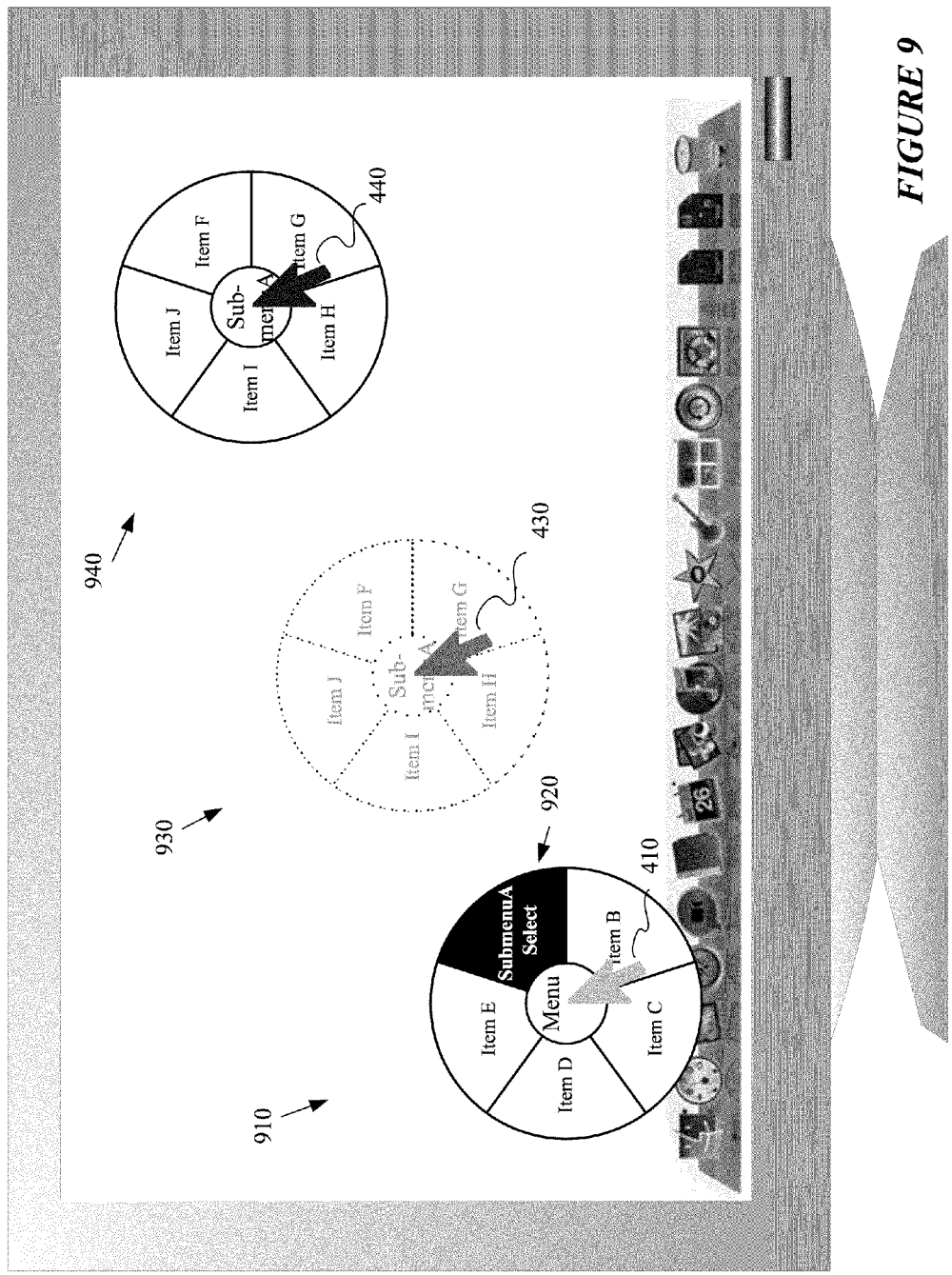
FIG. 9 illustrates where a submenu will be displayed in some embodiments.

FIG. 9 illustrates the location of a submenu in some embodiments. The figure illustrates a menu 910, a wedge corresponding to submenu selecting menu item 920, a faded submenu 930, a submenu 940 and the cursors previously described in reference to FIG. 4. As described in relation to FIG. 4, the position of the cursor at various times is represented in these figures by multiple cursors with the most faded cursors representing the earliest positions. In the figure, menu 910 appears around the first faded cursor 410. The menu 910 includes menu item 920, which corresponds to submenu A. That is, when menu item 920 is selected, the GUI 100 causes submenu A to be displayed. As in FIG. 4 a second faded cursor 430 represents the position of the cursor at the time the click was released.

FIG. 9 also shows that the cursor continues to move after the click is released, eventually stopping at the point shown by a third cursor 440. In some embodiments, the submenu 940 first appears when the cursor stops, and at the location where the cursor stops, rather than at the location where the click was released (as denoted by faded submenu 930).

In some embodiments, submenu 940 is displayed before the cursor stops moving. Instead, submenu 940 will be displayed while the cursor is still moving. In some such embodiments, the submenu will be displayed at the location where the cursor is predicted to stop. The prediction of where the cursor will stop can be determined by many different methods, as described above. In some embodiments, the submenu initially appears at the location of faded submenu 930 but does not remain there. In such embodiments, the menu moves along with the cursor until the cursor stops or disappears from the release location (around cursor 430) and reappears at the stopping location (around cursor 440).

C. Serial Sweep Commands

Figure 10A:
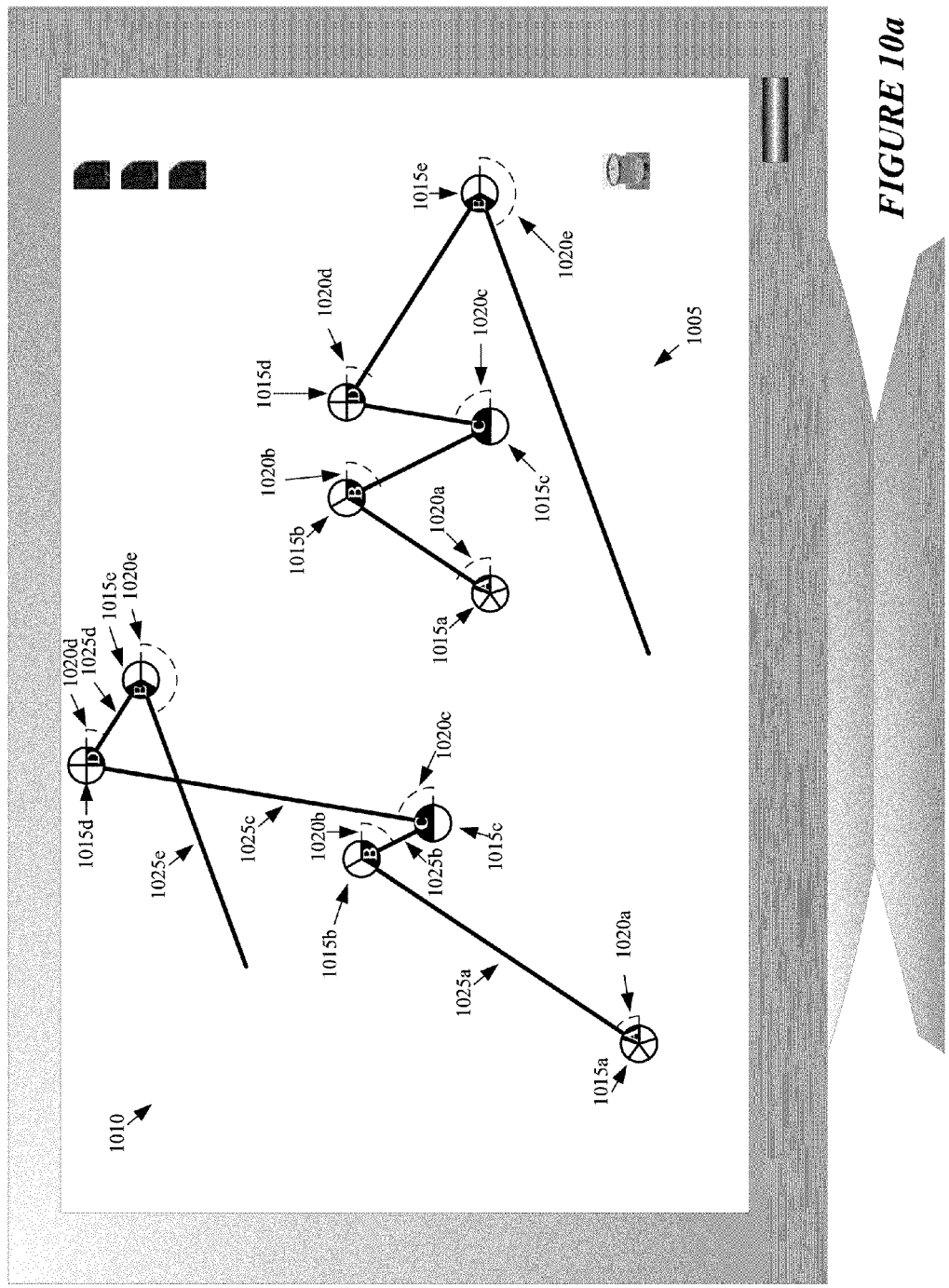
FIGS. 10a-10b illustrate two different paths that would both activate the same series of submenus.

In some embodiments, the length of the sweep movement does not affect what submenu appears. In such embodiments, only the angles of the sweep movements affect what submenus appear. FIG. 10a illustrates two possible paths, path 1005 and path 1010, that a cursor could be made to travel that would each activate the same series of submenus, despite the different appearances of each path from the other. Path 1010 and path 1005 each activate menus 1015a-1015e (i.e., an initial menu 1015a and submenus 1015b-1015e). Each of the corresponding angles 1020a-1020e determines which submenu of the preceding menu or submenu will be displayed after the sweep using that angle.

Figure 10B:
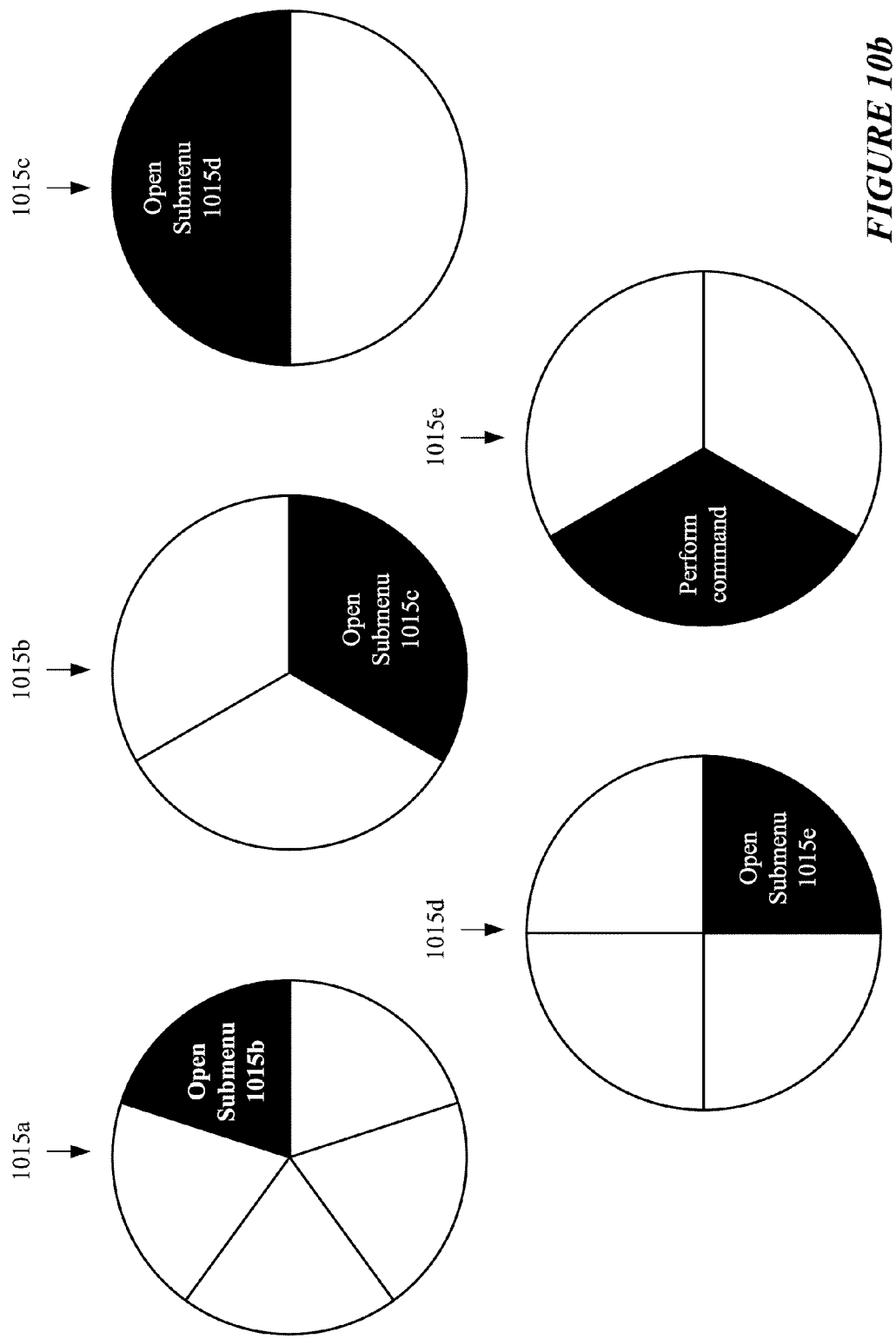

The menus can be seen more clearly in FIG. 10b, which illustrates a close up view of menus 1015a-1015e. Each of these menus (except submenu 1015e) has a command activated to open the next menu in the chain of menus shown in FIG. 10a. The command associated with submenu 1015e does not open a submenu, but instead causes a function associated with the command to be performed. Accordingly, submenu 1015e is the last in the chain of menus 1015a-1015e.

The lengths 1025a-1025e of the sweeps have no effect on what submenu will be displayed next. Accordingly, because each angle 1020a-1020e of path 1005 is equal to the corresponding angle in path 1010, the submenus that will be displayed are identical for each path. Because the angles of the sweeps affect the menu selection but the length of the sweeps do not, a user can more easily develop muscle memory for specific commands several submenus deep in the hierarchy. In some embodiments, the user may not even need to actually be actively looking at the menu on-screen to accomplish this—over time the user would build up a mental model for the spatial placement of the items and the action would dip out of a conscious action and into muscle memory.

FIG. 10b also shows that menus and submenus of a given embodiment can have different numbers of options. As the figure shows, menu 1015a has five menu items, submenu 1015b has three menu items, submenu 1015c has two menu items, submenu 1015d has four menu items and submenu 1015e has three menu items. As FIGS. 10a-10b illustrate, some menus can be many levels deep. A series of sweeps that requires holding a click for multiple sweeps may be uncomfortable. Accordingly, in some embodiments, a sweep command can be performed by clicking, releasing the click, and then moving the cursor, rather than holding the click while sweeping.

In some such embodiments, a button on a cursor control device is pressed and released only once to activate menu 1015a and initiate the series of sweeps. Once the initial menu 1015a appears, a first sweep that opens submenu 1015b (and all successive sweeps in the series) can be performed with no pressing of the button on the cursor control device. In some embodiments, other combinations of sweeps with a pressed button and sweeps with a released button can be performed to access menu items. For example, sweeps with the button pressed could be used to activate submenus 1015b-1015d and a sweep with the button released could be used to activate submenu 1015e and to select a menu item of submenu 1015e. Allowing a user to select menu items without regard to whether a button is pressed through the series of sweeps provides more flexibility to the user and prevents accidental releases of a cursor control device button from disrupting a selection involving multiple sweeps.

Some embodiments provide a GUI with radial menus in which a section of a menu selected by a sweep gesture either moves with the cursor, or is used to represent the cursor until the cursor (or wedge) stops, at which point, in some embodiments, it becomes (e.g., is replaced by or morphs into) a submenu. Similarly, in some embodiments that use sweep commands, during the sweep a submenu will be displayed under the cursor as it moves and moved with the cursor until the cursor comes to rest. In other embodiments, a faded version of the submenu will be displayed under the cursor as it moves and will become a non-faded version when the cursor stops. Some embodiments, described below, move menus after a sweep or other command to open a menu is completed.

III. Moving Menus

Whether an application is designed to have a menu (or submenu) displayed at a predicted location or at the actual stopping location of the cursor, the location for the menu (or submenu) to be displayed might be so close to an edge of the screen (or window) that displaying a menu around the cursor would cause the menu to extend past the edge of the screen. In order to put the entire menu on the screen, different embodiments can employ one or more of several different methods of automatically moving the cursor and/or the menu. In some embodiments, before the menu is displayed, the cursor is moved to a location with room for the menu to be displayed around the cursor. In some embodiments, the menu will be displayed around the cursor at the cursor's initial location and then move onto the screen (in some of those embodiments, the cursor moves with the menu). In some embodiments, the menu will be displayed in a location where it fits on the screen and then the cursor moves to the center of the menu.

Figure 11:
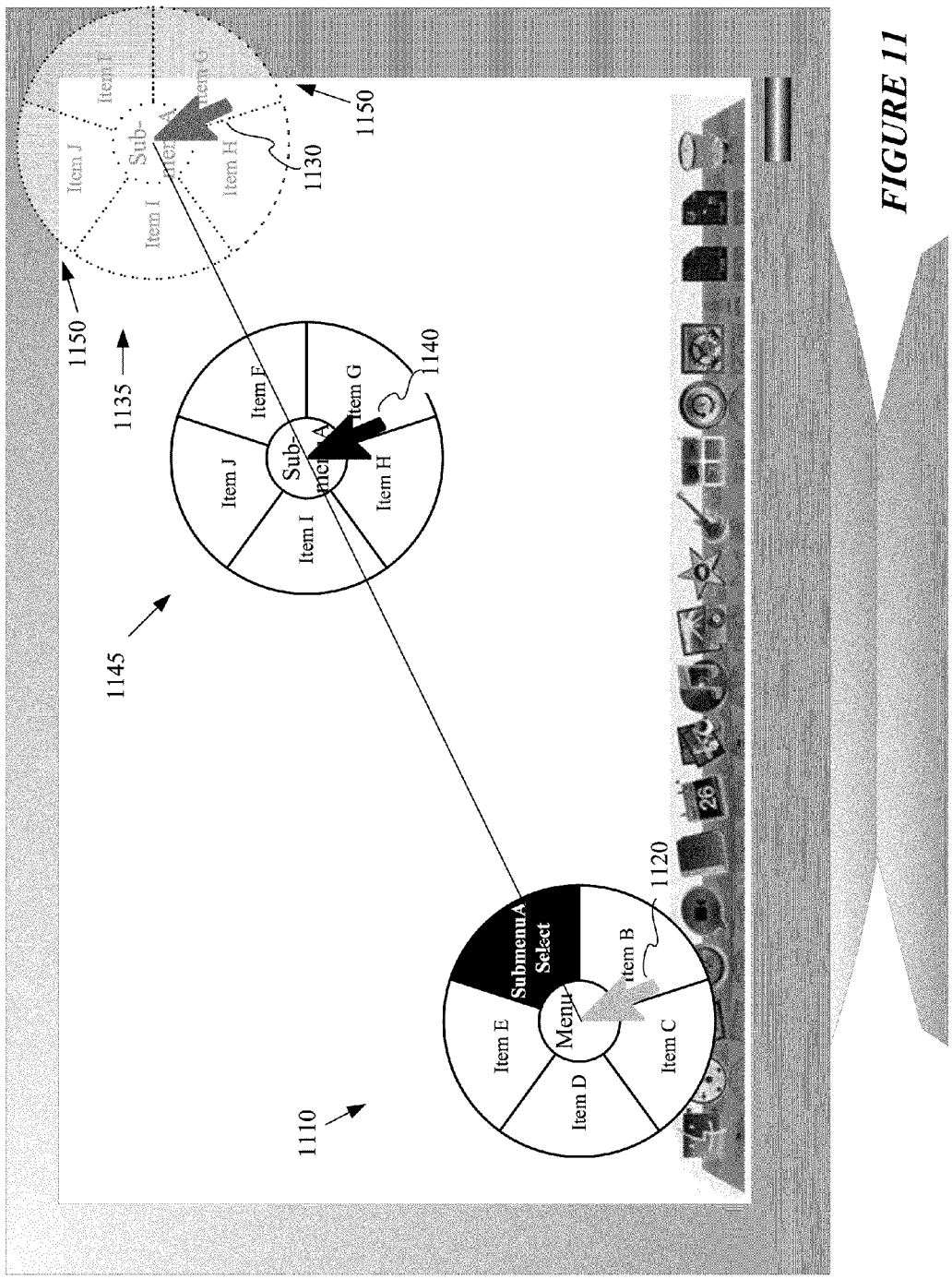
FIG. 11 illustrates moving a cursor far enough in from an edge to display a submenu.

FIG. 11 illustrates an example of moving a menu away from an edge. FIG. 11 illustrates a menu 1110 surrounding the location of a first faded cursor 1120, a second faded cursor 1130, a faded submenu 1135, a third cursor 1140, and submenu 1145 surrounding the third cursor 1140.

As the figure shows, if a submenu were displayed around location of the second faded cursor 1130, a location denoted by faded submenu 1135, that submenu would extend past the boundaries 1150 of the screen. Accordingly, the illustrated application has automatically moved the submenu and cursor to the location of third cursor 1140. As the location of the third cursor shows, in some embodiments, the relocated submenu will be displayed along the line of the sweep 1142. The new location is far enough within the boundaries 1150 of the screen that submenu 1145 can appear around the relocated third cursor 1140 without extending past the boundaries 1150 of the screen. Some embodiments also move the menu when it would extend past the edge of a window, even if it wouldn't extend past the edge of the screen.

Figure 12:
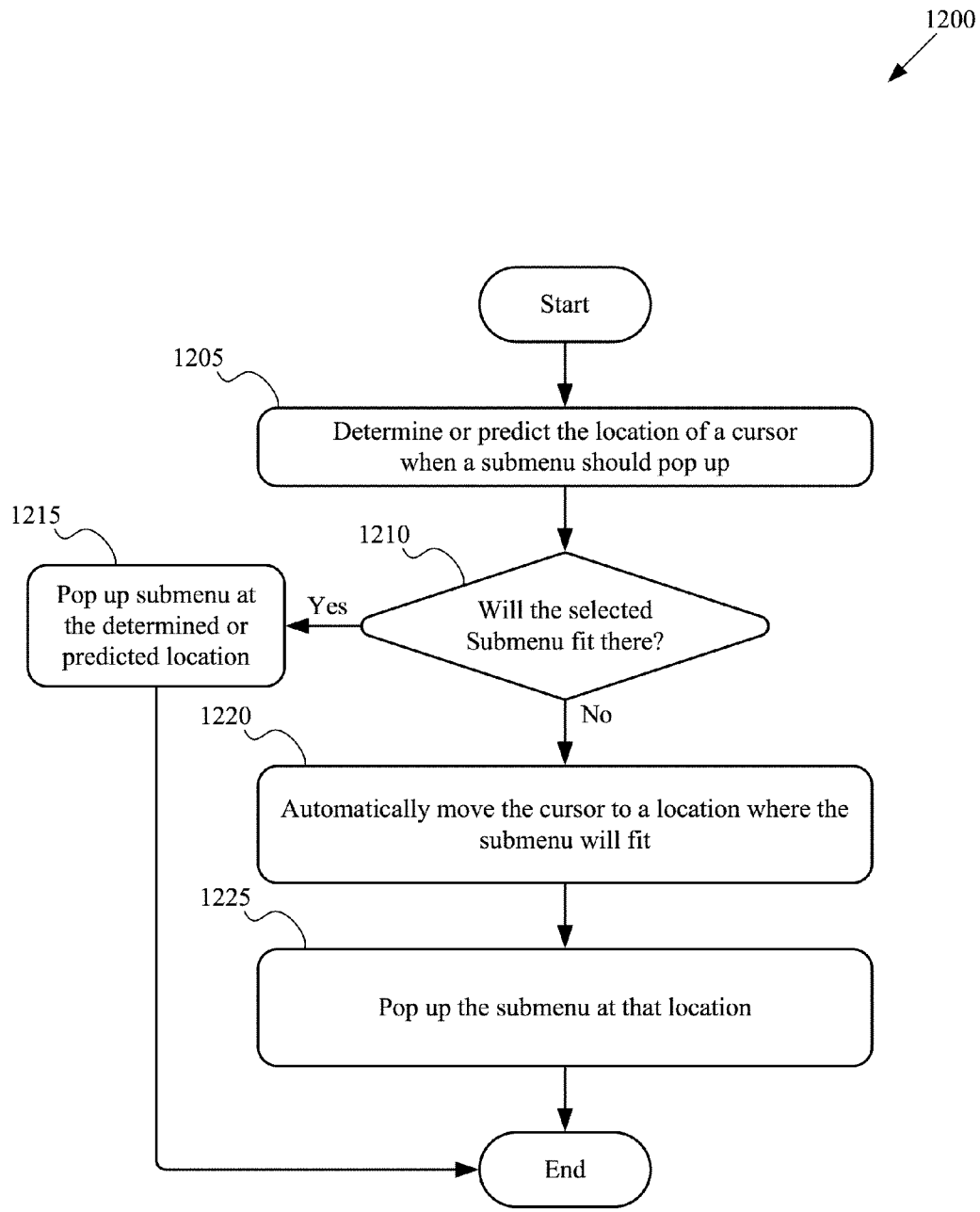
FIG. 12 illustrates a process for automatically moving a cursor in from an edge.

FIG. 12 illustrates a process 1200 of some embodiments for moving a submenu and cursor away from an edge of the screen. The process 1200 can be applied to predicted or actual locations of a cursor after a sweep command to open a submenu. The process 1200 can also be applied to any other command to open a menu (or submenu) that can open the menu too close to an edge. For example, if the initial menu in a hunt and click command appears near an edge, and a user selects a menu item close to the edge then the location where the submenu would otherwise be displayed would be partly over the edge.

The process 1200 determines (at 1205) where the submenu should be displayed. If (at 1210) the process 1200 determines that the submenu will fit in that location, then the process 1200 will display the submenu at that location (at 1215). If (at 1210) the process 1200 determines that the submenu will not fit at that location, then the process 1200 automatically moves the cursor (at 1220) to a location where the submenu will fit. In some embodiments, the cursor is moved directly away from the edge or corner it is too near. For example, if the submenu is too close to the left edge of the screen, the cursor will be moved to the right. In other embodiments, the cursor is moved back along the direction from which it came. For example, if a cursor was swept up and to the left to reach the place too close to the edge it will be moved down and to the right until it reaches a place far enough from the edge.

Various embodiments automatically move the cursor in various ways. For example, in some embodiments that move the cursor first, the operation (at 1220) moves the cursor animatedly, in the same manner as if the user was moving it with a mouse. In some embodiments, the operation (at 1220) makes the cursor vanish from the edge of the screen and reappear at a nearby point that will allow the submenu to be displayed. In some embodiments, the operation (at 1220) causes the cursor to vanish and reappear on the other side of the screen (sometimes called looping), far enough inside the screen to open the submenu entirely within the screen. In some embodiments, the operation (at 1220) makes the cursor "bounce" off the edge of the screen and end up far enough inside to display the submenu. In some embodiments, rather than first moving the cursor and then displaying the submenu, the submenu is first displayed at a location where it will fit, and the cursor is then moved to a location within the submenu (e.g., the center) via one of the operations described above.

In some embodiments, the cursor is simply prevented from getting too close to the edge of the screen. In some such embodiments, once a sweep command (or other submenu selecting command) has been performed and a submenu has been selected, the application "knows" that where the cursor stops, a submenu of a particular size will be displayed. Accordingly, in some embodiments, the application simply ignores commands that would move the cursor too close to the edge of a screen to accommodate a submenu of that particular size.

In some embodiments, when the cursor starts to move too close to an edge of a window, the cursor becomes harder to move. That is, the amount of movement of the cursor controller necessary to move the cursor a particular distance increases. In some embodiments, the distance the cursor travels for a given command from the cursor control device drops exponentially. In some embodiments, the cursor acts as though there is an increasing frictional force preventing it from moving quickly. In other embodiments, the cursor acts as though there is a force gradient pushing it away from the edge. In some embodiments, it takes a larger command to the cursor to move closer to the edge than to move away from the edge and when a user stops moving the cursor closer to the edge it automatically slides away from the edge.

Whether the cursor is moved away from the edge, or prevented from reaching the edge, the process 1200 will display (at 1225) a submenu at the new location of the cursor. In some embodiments, a submenu will be displayed under the cursor and moves with it until the cursor comes to rest, with the moving submenu providing a visual cue as to why the cursor does not move closer to the edge than some particular distance.

Figure 13:
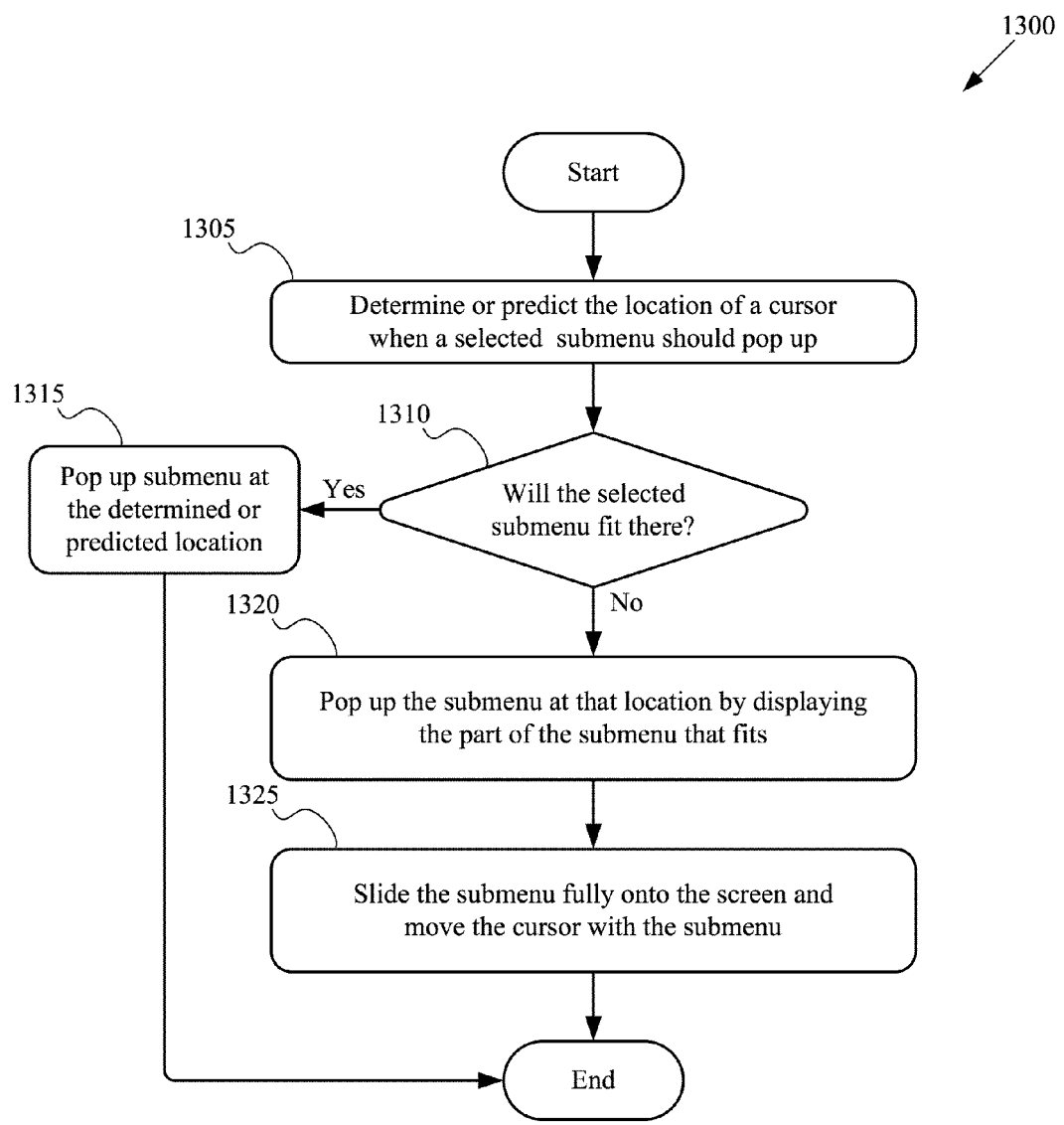
FIG. 13 illustrates a process for automatically moving a menu in from an edge.

FIG. 13 illustrates a process 1300 of some embodiments for displaying a submenu at the location of a cursor and then moving the submenu further into the screen. As was the case with process 1200, process 1300 can be applied to sweep commands as well as any other command to open a menu or submenu that can open the menu or submenu too close to an edge.

Figure 14:
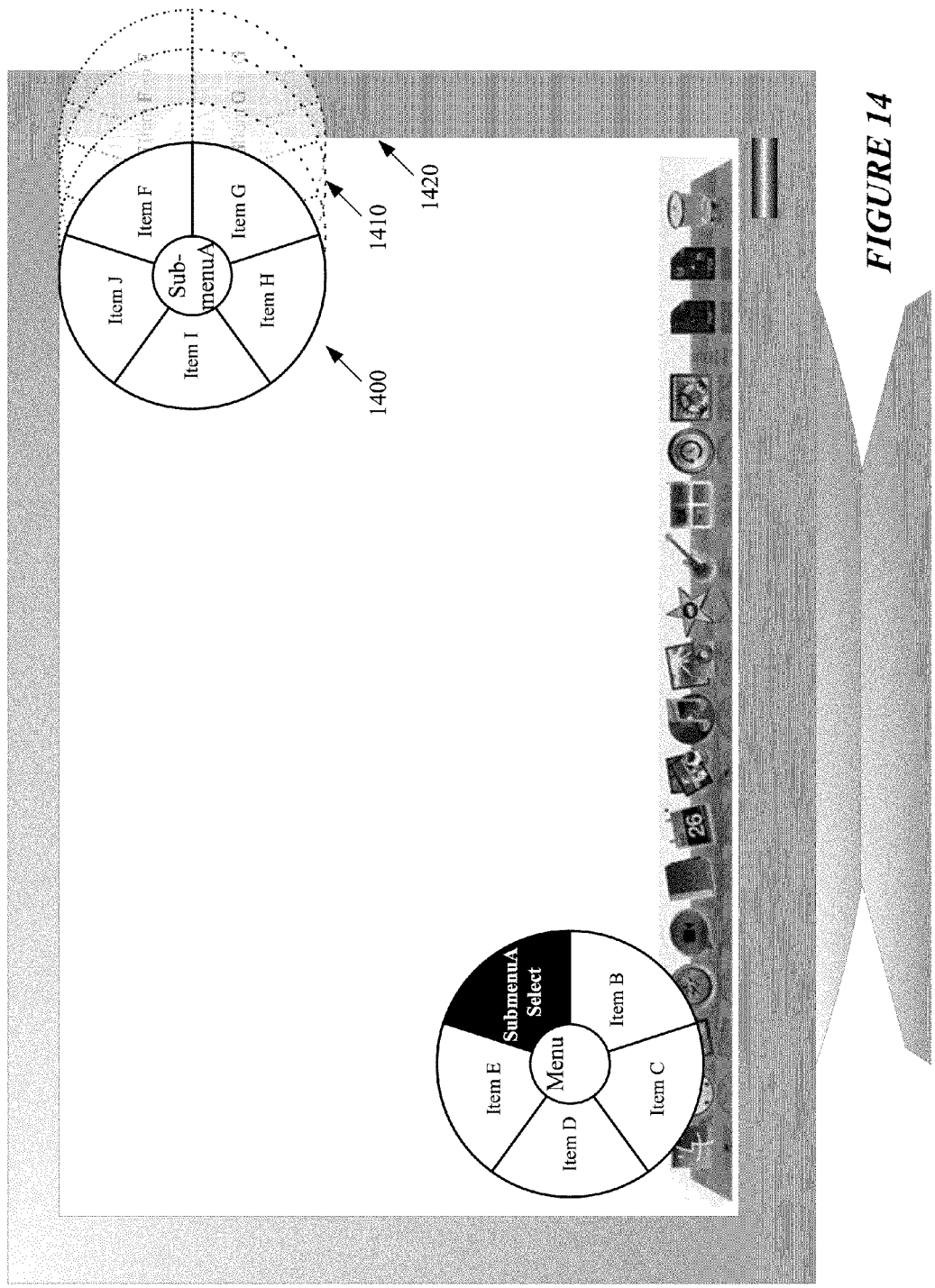
FIG. 14 illustrates the motion of a submenu onto a screen.

Process 1300 is similar to process 1200 up until operation 1320. Briefly, the process 1300 determines (at 1305) where the submenu should be displayed. If (at 1310) the process 1300 determines that the submenu will fit in that location, then the process 1300 will display the submenu at that location (at 1315). If (at 1310) the process 1300 determines that the submenu will not fit at that location, then the process 1300 will display as much of the submenu as will fit (at 1320). Once the submenu has been displayed, the process 1325 slides the submenu away from the edge, displaying more and more of the submenu, until the entire submenu is displayed. In some embodiments, the operation 1325 slides the submenu by repeatedly redrawing the submenu over a short period of time, moving the menu further onto the screen with each redrawing. FIG. 14 illustrates the motion of a submenu 1400 onto the screen. The faded submenus 1410 represent the repeated redrawing of the submenu as it is moved onto the screen from an initial location where only half of the submenu fits on the screen. In the embodiment of FIG. 14, the final location of the menu 1400 is determined by moving the menu 1400 directly away from the edge 1420 that it extends past rather than back along the line of a sweep gesture that took the cursor too close to the edge. In some embodiments, moving the menu entails redrawing the menu many more times than is illustrated in FIG. 14 so as to appear to the user that the menu is sliding onto the screen. In other words, the menu appears to move, rather than appearing to be repeatedly erased and redrawn.

In some embodiments, operations 1320 and 1325 are combined, so that when a cursor stops near or at the edge of the screen, the submenu will be displayed and moved at the same time. FIGS. 15a-15f illustrate a submenu 1500 starting off small and expanding against first one, then two edges. In FIG. 15a submenu 1500 starts off as a small object around the point of cursor 1505, with the top of the submenu 1500 against a top edge 1510 of the screen (only the top edge 1510 and the left edge 1515 are shown). In FIG. 15b, the submenu 1500 has expanded, the top of submenu 1500 is still against the top edge 1505 of the screen and the center of submenu has moved away from the top edge 1505 as the menu has expanded. In FIG. 15c, the left edge of the expanding submenu 1500 has reached the left edge 1515 of the screen. Because the expansion has reached the left edge of the screen, the center of submenu 1500 has moved to the right in order to keep the submenu 1500 on the screen as it expands.

In FIGS. 15d-15f the edges of the submenu stay at the edges of the screen, but the center of the submenu moves away from the edges of the screen as submenu 1500 expands until it reaches full size in FIG. 15f. In the embodiment of FIGS. 15a-15f, the cursor 1505 moves along with the center of the submenu 1500 as the submenu 1500 expands. In other embodiments, a cursor does not move along with an expanding submenu. The embodiments illustrated in FIGS. 15a-15f do not display the text of the submenu 1500 until the submenu 1500 has fully expanded. However, some embodiments display the text of a submenu while the submenu expands.

Some embodiments that use an absolute position controller will not display a submenu if a cursor is moved too close to the edge of the screen. In some such embodiments, the submenu will be displayed the next time the user places the cursor far enough within the boundaries of the screen. In other such embodiments, moving the cursor too close to the edge of a window or screen aborts the menu item selection process. Other embodiments display a submenu somewhere on the screen when the cursor gets too close to the edge and then use the absolute position controller as a relative position controller, either until a selection and activation of a menu item of the submenu is made, or until the entire menu selection process is complete. Some embodiments take this a step further and start to use the absolute position controller as a relative position controller as soon as the initial menu is activated.

Some embodiments allow submenus to be activated by sweep gestures and also allow the submenus to be activated by alternate means. For example, some embodiments allow submenus to be activated by hunt and click or by moving the cursor over a menu item then leaving it there for some period of time (sometimes referred to as "spring loading" or "spring-loading" the menu). In such embodiments, the same processes that move a cursor or a menu after a sweep command, as described above, can move the cursor or menu after a spring-load or hunt and click command.

Various embodiments determine the location at which the submenu will ultimately be displayed in various ways. In some embodiments, when a sweep gesture is used to open a submenu, the embodiment identifies a line from the starting point of the sweep to the end of the sweep, then displays the menu along that line. In other words, in such embodiments, the cursor or the menu moves back along the line of the sweep. In some embodiments, the final location of the submenu is the closest location to the edge that the cursor is near that allows the menu to be fully displayed. In other words, the cursor or menu moves directly away from the edge or edges of the window or screen to which it is too close.

IV. Spring-Loaded Commands

Figure 16:
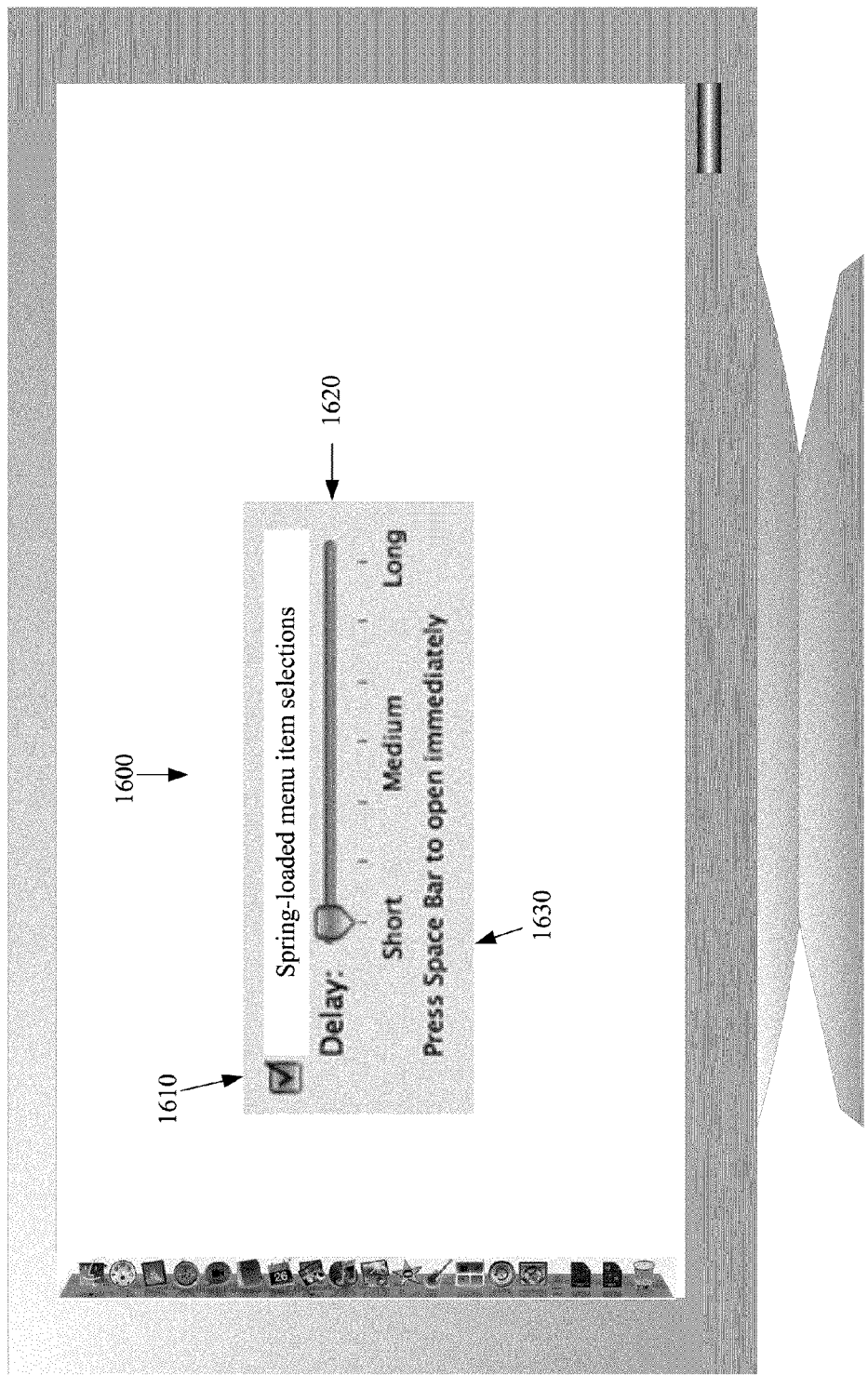
FIG. 16 illustrates a spring-loaded control of some embodiments.

Some embodiments use spring-loaded commands that allow a user to select and activate a menu item by keeping a cursor in the same place over the menu item for a preset length of time (sometimes called "hovering" or "dwelling"). Once that time has elapsed, the application interprets the hovering of the cursor as a command to select and activate that item. Some embodiments employ a noise compensation function to filter out the effects of minor cursor movements such that these minor movements do not cause the preset length of time to reset. Some embodiments provide controls for setting the timing of spring-load commands and/or turning the spring-load feature on and off. FIG. 16 illustrates a spring-load control 1600 of some embodiments. The spring-load control 1600 includes a check box 1610 for deactivating the spring-load option altogether, and a slider control 1620 for setting the time that the application will delay (sometimes called the duration of the delay) before determining that an unmoving cursor is a spring-load command. Some embodiments allow a user to click on the key identifier 1630 to set or change a keyboard key (and/or set or change a cursor controller key) that will preempt the delay time and cause the application to immediately perform the action that would otherwise not happen until after the delay set on the slider.

Figure 17:
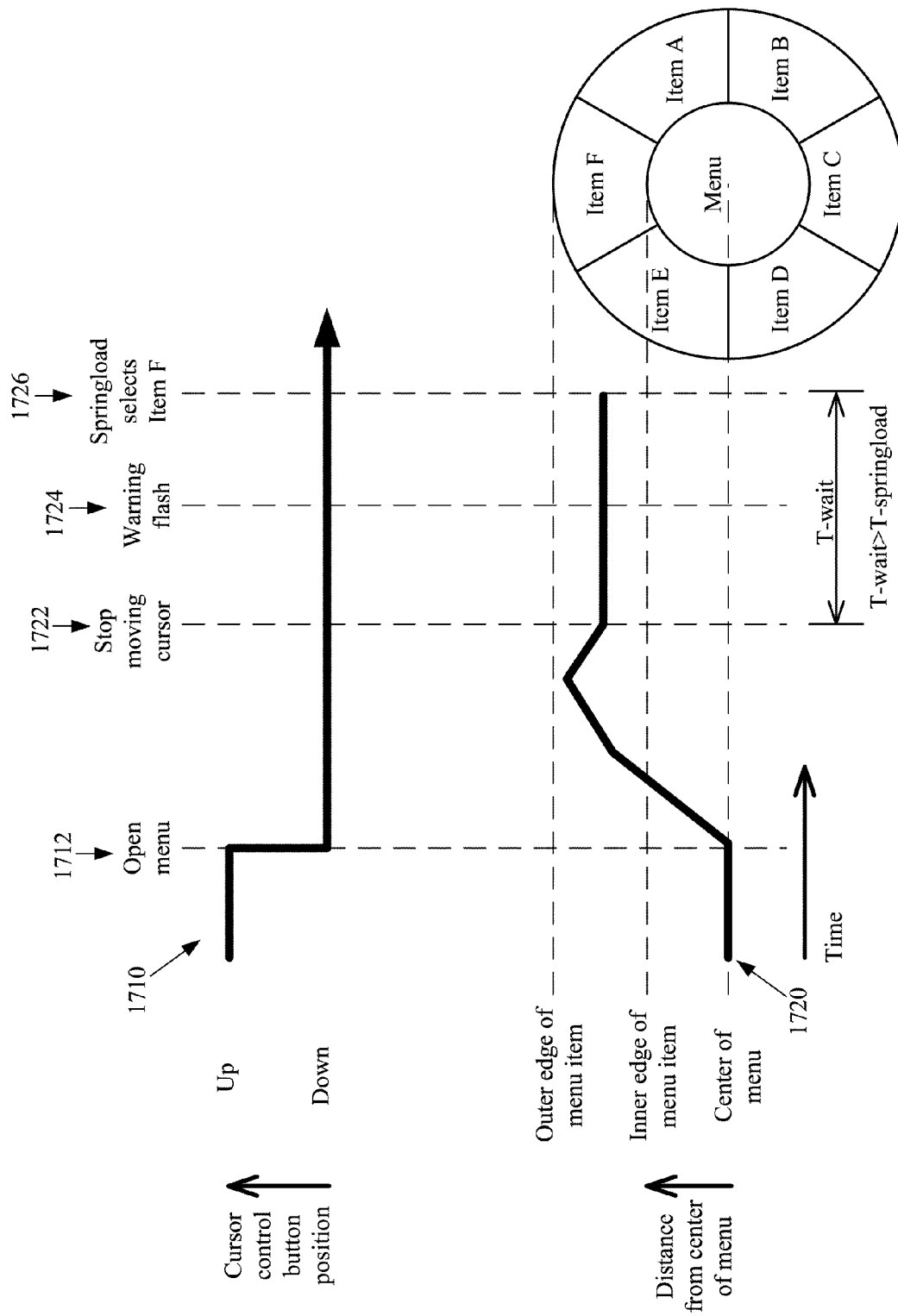
FIG. 17 illustrates a timing diagram for a spring-load command.

FIG. 17 illustrates a timing diagram 1700 for a spring-loaded selection. The timing diagram 1700 includes button setting line 1710 that identifies the actions of a cursor control button (or equivalent control such as a stylus on a graphics tablet) and cursor position line 1720 that identifies the movement of the cursor commanded by the cursor control device. Line 1710 shows a press of the button to open a menu at time 1712, and after the button is pressed it is held down. Line 1720 shows that while the button is held down, the cursor controller begins to command the cursor to move, eventually stopping at time 1722. The cursor then waits there for the preset time for spring-loading. At time 1724, the cursor has been still for long enough that some embodiments cause the menu item to blink or otherwise react to provide a visual indicator to a user that a spring-load selection is about to occur. For example, in some embodiments the menu item over which the cursor is hovering flashes a different color to indicated that the spring-load selection will occur soon.

Figure 18:
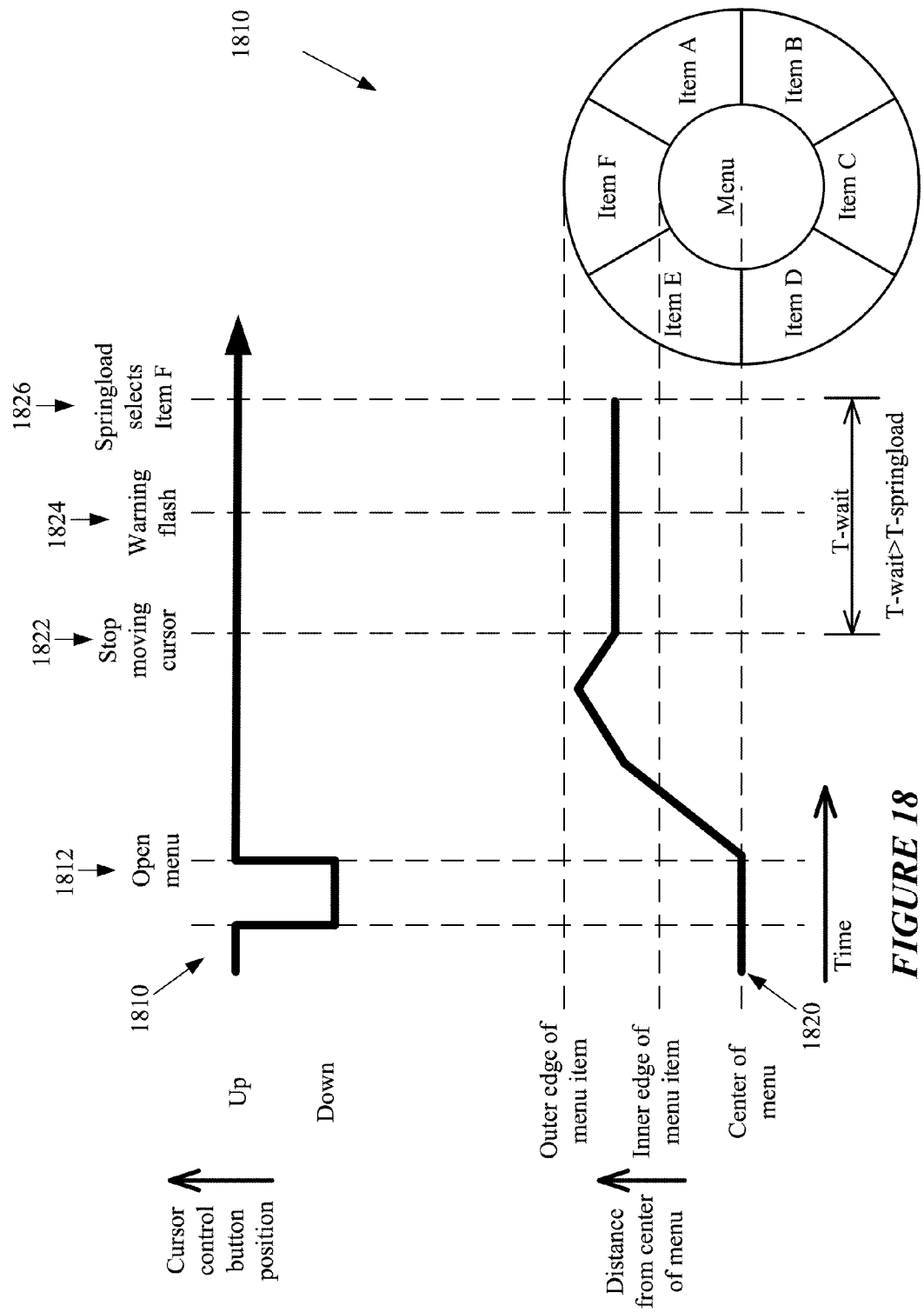
FIG. 18 illustrates a timing diagram for an alternate spring-load command.

At time 1726, the cursor has been waiting at one location for longer than the preset time for a spring-load command, so the application selects item F. In some alternate embodiments, a spring-load command can be performed by keeping the cursor in one place on a menu item without holding the cursor button. FIG. 18 illustrates a timing diagram 1800 for such a spring-load command. Apart from the menu being opened by a click command that releases the button at time 1812, and the button not being held down, the two spring-load command timing diagrams are the same. Spring-load commands can also be used in some embodiments to select and activate menu items without either a press-and-hold operation or a press-and-release operation preceding the movement of the cursor over the menu item.

Figure 19:
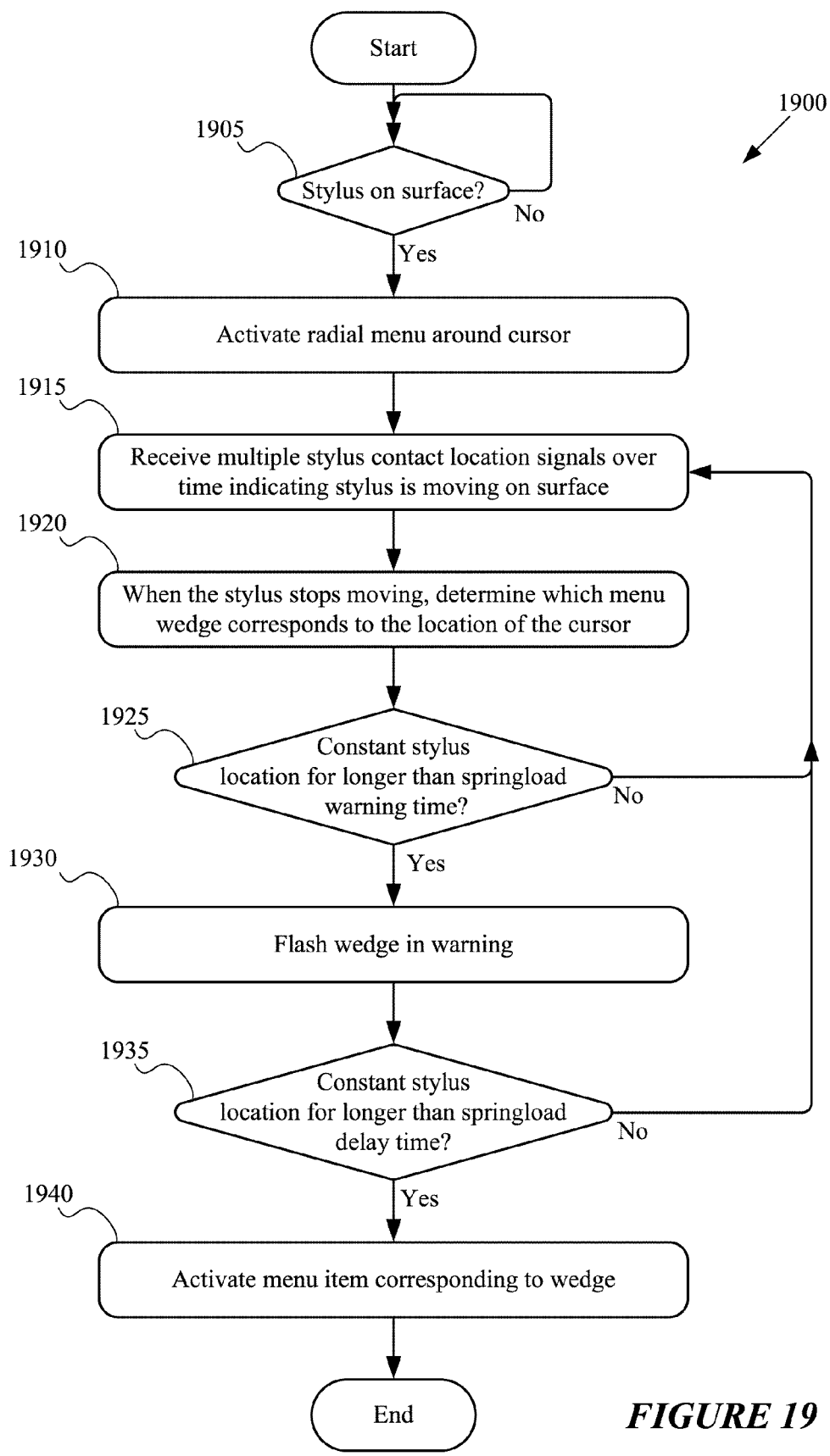
FIG. 19 illustrates a process for activating a menu item using a graphics tablet and a stylus to perform a spring-load command.

FIG. 19 illustrates the process 1900 of some embodiments for activating a menu item with a spring-load command using a graphics tablet or touch screen. The process 1900 waits (at 1905) for a stylus to touch the surface of the tablet. Once the contact has been made, the process 1900 will display a radial menu (at 1910) around the cursor that appears at the location on the display corresponding to the place where the stylus touched the tablet.

The process 1900 receives (at 1915) multiple signals from the tablet. These signals include information identifying the location of the stylus at various times. Based on these signals, the process 1900 determines which wedge the cursor is over. If (at 1925 or 1935), the stylus moves before a preset time (i.e. the warning time or the spring-load time) has elapsed then the process 1900 loops back to receiving multiple stylus contacts (at 1915).

If (at 1925) the location of the stylus stays over one wedge in the same location for longer than a preset amount of time, the spring-load warning time, then the wedge flashes (at 1930) to alert the user that a spring-load command is about to be received. If (at 1935) the stylus has been in one place for longer than the preset spring-load delay time then the process 1900 activates the menu item under the cursor. In some embodiments that use spring-loaded commands, rather than being required to keep the cursor in the same place for a preset length of time with only minimal movement, a user need only keep the cursor over the menu item without moving the cursor outside the menu item for the preset length of time in order to activate the spring-loaded command.

Whether a spring-loaded command requires a still cursor, or one that merely stays within one menu item, in some embodiments, if a selected menu item corresponds to a command to open a submenu, then the submenu will be displayed around the cursor. If the menu item corresponds to a command that does not open a submenu, then the command is performed. Some embodiments provide applications with a similar process for allowing a mouse controller to be used to spring-load a menu item. In those applications, when the mouse does not move for the preset length of time, the application receives the activates the menu item.

Some embodiments allow a user to preempt the spring-load delay time by pressing a keyboard shortcut key (e.g., the spacebar, the enter key, or any other key chosen by a user). Using a cursor control device, if a user places the cursor over a menu item and then presses the chosen keyboard shortcut key, the menu item is performed in these embodiments. This allows the user to select and activate the menu item without waiting for the entire spring-load delay time. In some embodiments, the user can preempt the delay time either before or after the menu item has flashed due to the spring-load warning time being reached.

V. Alternate Menu Item Selection

Figure 20:
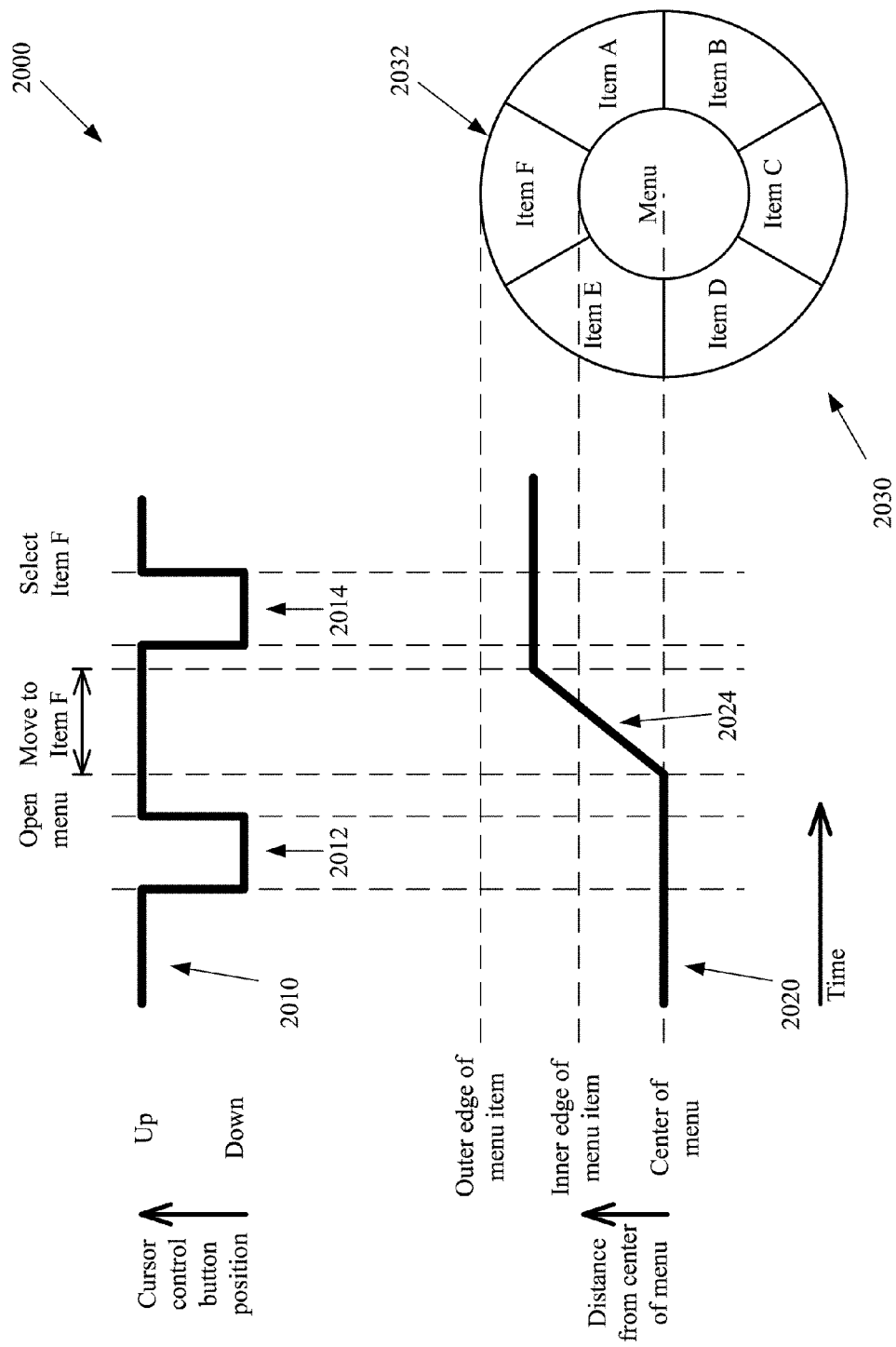
FIG. 20 illustrates timing diagrams for hunt and click commands.

Some embodiments use other operations to select menu items. FIG. 20 illustrates a timing diagram for selecting a radial menu item by hunt and click commands. FIG. 20 illustrates a combined diagram 2000 which shows: 1) a line 2010 identifying what actions are being performed via a button (or equivalent control(s)) of cursor controller at various times and 2) a line 2020 identifying the location of a cursor, relative to a radial menu 2030, at various times.

As the figure shows, a click command 2012 occurs when a cursor control is activated briefly, then deactivated. For example, the click command 2012 could be sent by a user pressing a mouse button briefly then releasing it or by a user tapping a stylus on a touchpad. In some embodiments, click command 2012 opens the radial menu 2030 centered on the cursor. The user then moves the cursor from the center of the menu into the wedge of one of the menu items, as indicated by diagonal portion 2024 of line 2020. Here, item F 2032 is provided as an example, although the cursor could also be moved to any of the other menu items. Once the cursor is within the desired item, the user sends another click command 2014 to select and activate the desired menu item.

Some embodiments allow a user to activate an item of a radial GUI object by various operations using input devices other than cursor controllers (or cursor controllers with additional functions). Some such embodiments allow a user to select an item using an input device, but do not automatically activate the selected item. In some embodiments, the selected item is indicated by having a darker color than the other items, or a lighter color, or inverted colors, etc. The user can send a signal to activate the selected item.

Figure 21:
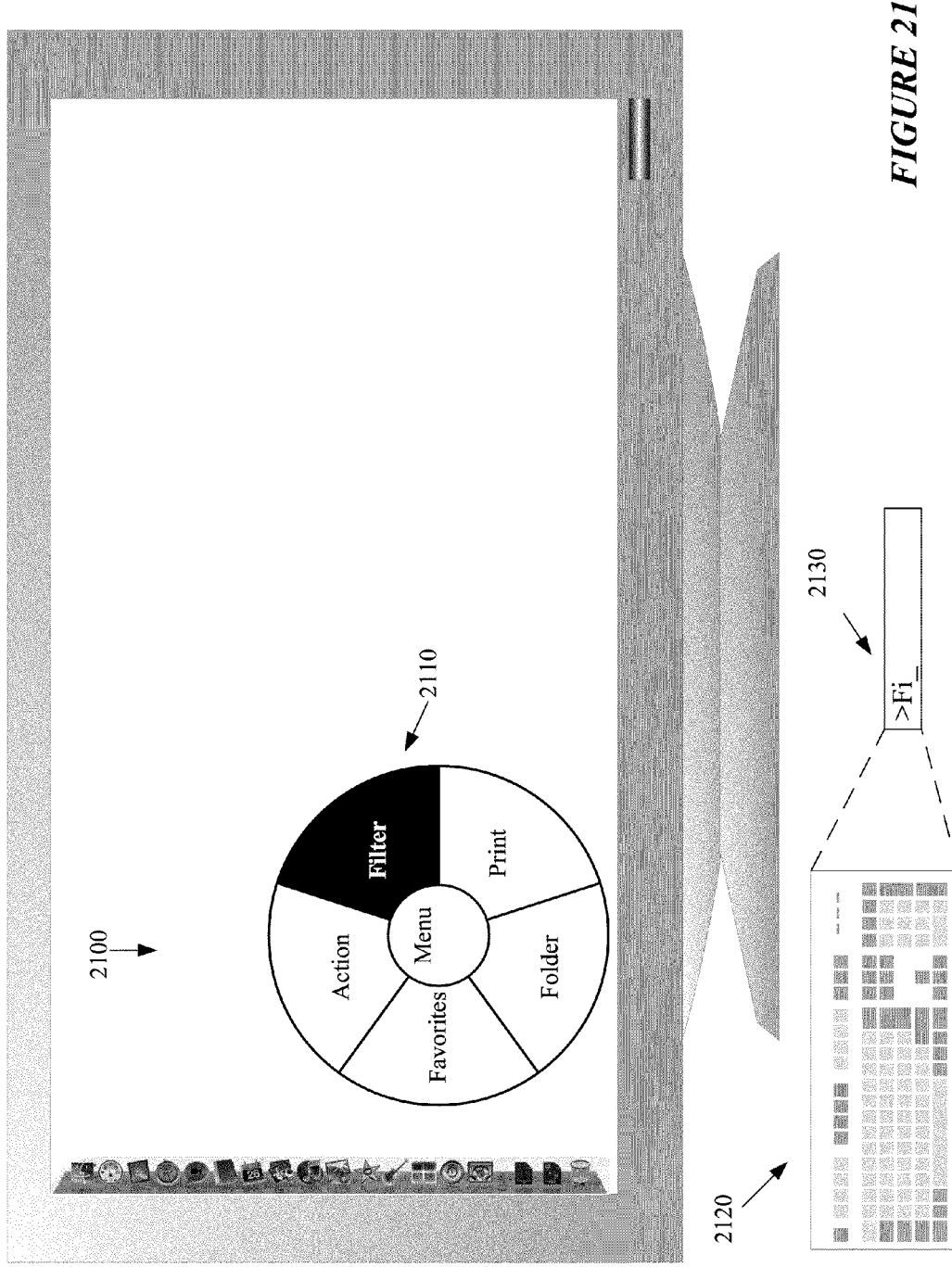
FIG. 21 illustrates a radial menu with an item selected via keyboard.

In embodiments in which the menu displays labels for each item, a menu item can be selected by typing at least part of the name of that item on a keyboard. FIG. 21 illustrates a radial menu with an item selected via keyboard. As the figure shows, menu 2100 has multiple named wedges, including wedge 2110, with the name "Filter" in it. On keyboard 2120, the user has typed "Fi" 2130. As "Filter" is the only menu item that starts with the letters "F" and "i", wedge 2110 has been selected. In some embodiments, the user can then activate the wedge by pressing a keyboard key (e.g., the enter key or the space-bar) or a key on some other input device.

Figure 22:
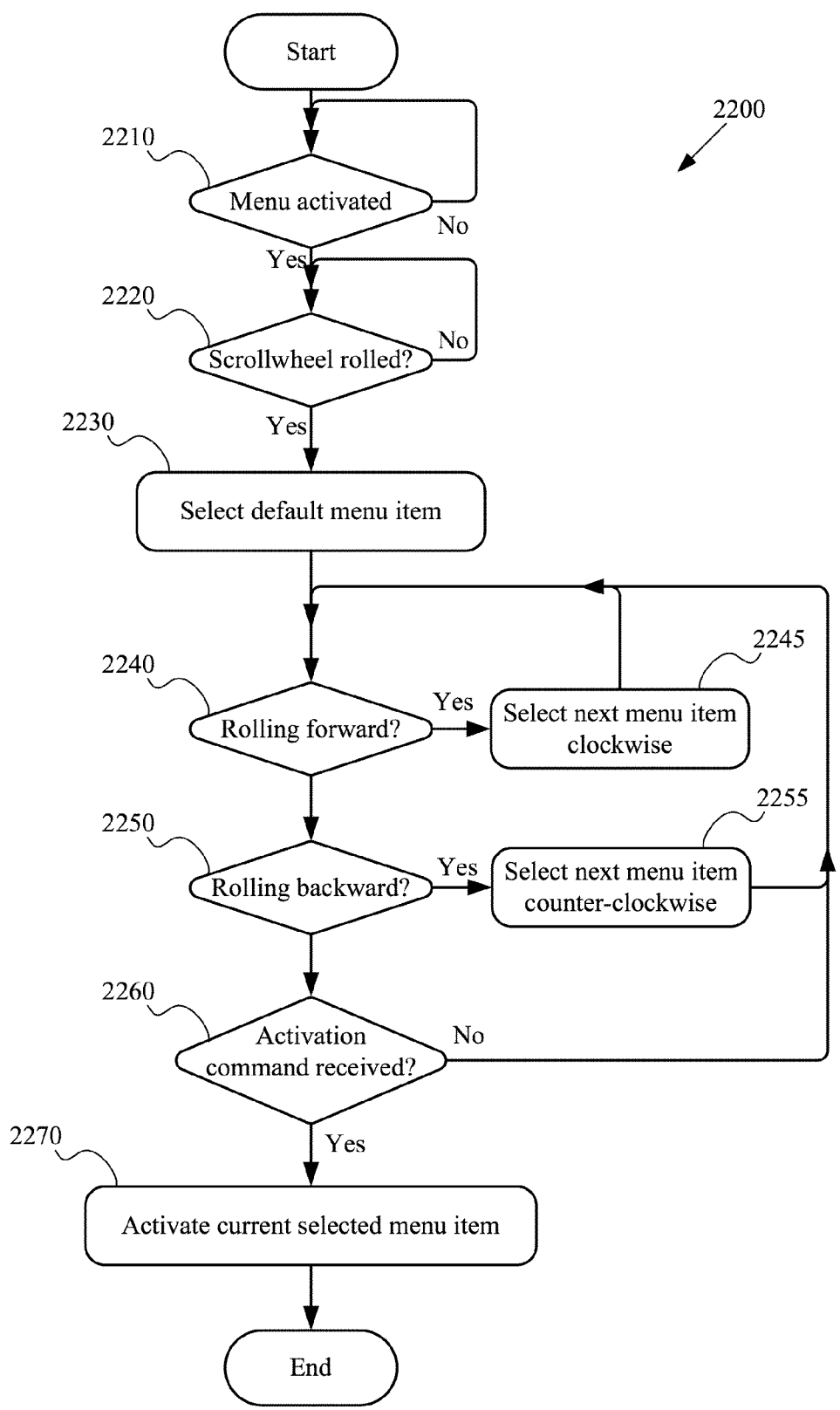
FIG. 22 illustrates a process for using a scrollwheel to select menu items.

Some embodiments allow a user to select menu items with a scrollwheel or equivalent control (e.g., some touchpads, arrow keys on a keyboard, etc.). FIG. 22 illustrates a process 2200 of some embodiments for selecting menu items using a scrollwheel. The process activates a menu (at 2210), and if the scrollwheel is rolled (at 2220) then a default menu item is selected (at 2230). Some embodiments initially select the menu item at the top of the radial menu (e.g., whichever menu item includes the angle 90° off the horizontal. In some embodiments, if (at 2240) the scrollwheel is rolled forward, then the next menu item in the clockwise direction will be selected (at 2245). If (at 2250) the scrollwheel is rolled backward, then the next menu item in the counter clockwise direction is chosen. Other embodiments use the opposite directions (i.e., the scrollwheel being rolled forward corresponds to counterclockwise movement through the radial menu items). In some embodiments, a noise filter function is used to ignore small mouse movements while a scrollwheel is being turned. Such filters protect against the scrollwheel selection process being interrupted by the system misinterpreting an accidental mouse movement as a different input method, such as a sweep or hunt and click.

In some embodiments, if a scrollwheel is rolled far enough in one direction (e.g., each menu item selected once), then the selection returns to the first menu item after the last item is selected. In some such embodiments, the selection can loop back to the first menu item any number of times as the scrollwheel continues to roll in that direction. In some such embodiments, if the scrollwheel is rolled far enough in the opposite direction (e.g., each menu item selected once) then a center item of the menu is selected to allow the user to dismiss the menu with an activation command.

If (at 2260) an activation command is received, then the process 2200 activates (at 2270) the item that is selected when the activation command is received. Otherwise, the process 2200 loops back to operation 2240. In some embodiments, gestures on a touchpad can substitute for the scrollwheel. For example, in some embodiments, sliding one, two, or more than two fingers linearly down a touchpad is used to scroll through (e.g., select) menu items. Similarly, in some embodiments, placing two fingers on a touchpad and rotating them relative to each other (pivoting) or sliding them along with each other in a rotational motion can be used to scroll through (e.g., select) menu items. In some embodiments that select items from a radial menu, the default selected item is the menu item corresponding to the angle of 90° from the horizontal (i.e., the 12 o'clock position). For example, in FIG. 21, the item "Action" of radial menu 2100 would be initially selected. A scrollwheel, trackpad gesture, or other such input could then be used to scroll through the other menu items of radial menu 2100 either clockwise or counterclockwise.

Some recent computers with touchpads (e.g. Apple® laptops) support 'trackpad gestures'. For example, if a user places two fingers on the trackpad and pivots the fingers, the computer interprets the pivoting as a rotate gesture. In some embodiments, depending on the direction of rotation the selection would progress clockwise or counter-clockwise, in a similar manner to the process 2200. Some embodiments allow a user to select successive radial menu items using the arrow keys of a keyboard. The down and left keyboard arrows cause the selection indicator to move counter-clockwise.

In some embodiments, if some means other than a cursor controller is used to select a menu item that activates a submenu, the cursor is automatically moved (e.g., an animated sliding of the cursor) to the location of the center of the activated menu. In other embodiments, the menu activates around the current location of the cursor when a submenu is selected by some means other than a cursor controller. In still other embodiments, the menu opens up somewhere other than around the cursor (e.g., at the location of the menu item that opened the submenu) and neither the cursor nor the menu are moved.

Some embodiments allow a user to activate menu items using a cursor controller (e.g., hunt and click, gestural, spring-loaded) and also allow a user to select and activate menu items with keyboard inputs, trackpad gestures, and/or scrollwheels.

VI. Cursor Control Devices

As described above, various types of cursor control devices can be used in conjunction with some embodiments of the present invention. Relative position cursor control devices ("relative position controllers") are devices that are used in conjunction with GUIs to move a cursor relative to its pre-existing position. Relative position controllers include devices such as mice, trackball mice, touch-pads (e.g., laptop touch-pads) and joysticks. Absolute position cursor control devices ("absolute position controllers") are devices that provide a one-to-one correspondence between positions of particular points on the device and locations on a screen of a GUI. Absolute position controllers include graphics tablets (sometimes called "graphics pads", "digitizing tablets", or "drawing tablets"), signature recorders at retail establishments, touch-screen computers, many ATM screens, and touch-screen devices such as the iPhone®.

Some types of hardware can be used as either relative position controllers or absolute position controllers. For example, a GUI could be set to move the cursor to a location on the screen corresponding to the location on a touch-pad that was touched, thus using the touch-pad as an absolute position controller. However, a GUI could also be set so that when a touchpad is touched, the cursor does not go to a location corresponding to the location at which the touch pad was touched but instead moves only when the touch-pad is stroked, thus using the touch-pad as a relative position controller.

Some embodiments operate with cursor control devices that use a relative position system, some embodiments operate with cursor control devices that use absolute position systems, and some embodiments work with either type of device. Such devices are further described below.

A. Relative Position Cursor Control Devices

Some embodiments use relative position cursor controllers such as mice or touch-pads. Relative position cursor controllers command the cursor to move relative to its existing position. That is, the cursor controller sends commands to the computer that the computer interprets as commands to change the position of the cursor, rather than commands to move the cursor to a particular location. If a cursor is at the left edge of the screen and the relative position cursor controller commands it to move right, the cursor moves to the right of its starting position (at the left edge of the screen). Likewise if the cursor is at the middle of the screen and is commanded to move right, it moves right relative to its starting position at the middle of the screen.

Relative position cursor controllers typically do not measure an absolute position of the control. Accordingly, in some embodiments when a cursor stops at a position that is too close to an edge of the screen and is automatically moved to a new location (as described in section III above) the new location becomes the position from which the relative cursor controller acts.

Figure 23:
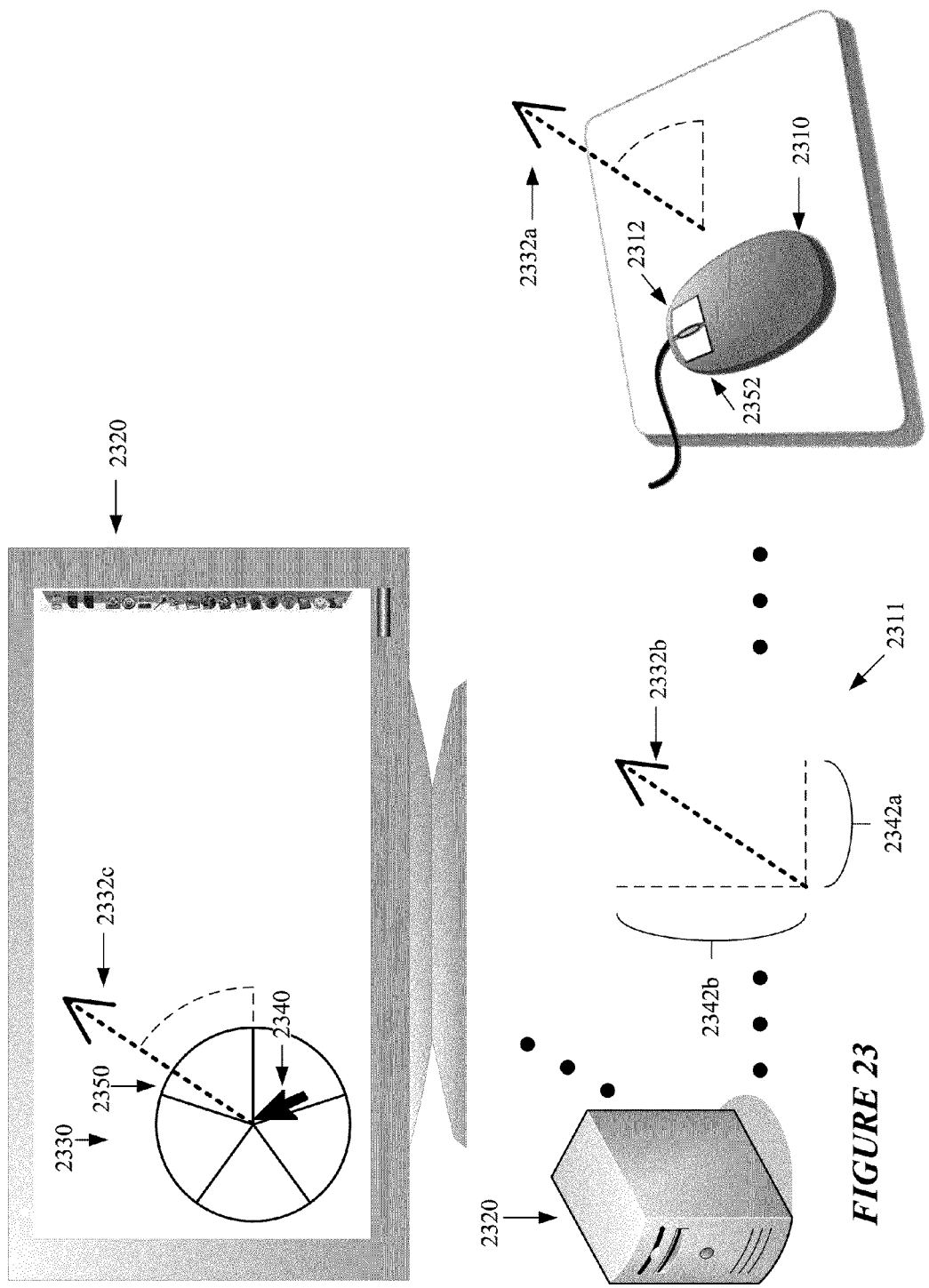
FIG. 23 illustrates a mouse, computer, and a display screen with the graphical user interface of some embodiments.

One example of a relative position cursor control device is a computer mouse. FIG. 23 illustrates a mouse 2310, a computer 2314, and a display screen 2320 of some embodiments. A mouse button 2312 can be pressed, which sends a signal to computer 2314 (not drawn to scale) that the button has been pressed. The computer 2314 has drivers that interpret the signal and pass that information on to an application that uses radial menus. The application uses a graphics card in the computer 2314 to cause the menu 2330 to be displayed on display screen 2320 around cursor 2340 in response to the pressing of the button 2312.

The mouse 2310 can be moved in any direction such as the direction of arrow 2332a. The mouse 2310 sends a signal 2311 to the computer (which the computer drivers interpret and pass to the application) that the mouse 2310 is moving along the direction of arrow 2332a at a particular speed. In some embodiments, the signal 2311 corresponds to the mouse's actual direction and speed as indicated by arrow 2332b. In other embodiments, the signal 2311 corresponds to the mouse's motion in the x direction 2342a and the y direction 2342b. The drivers (or the application) interpret the signals from the mouse. The application then moves cursor 2340 in the direction of the arrow 2332c and performs any actions that it is programmed to perform when the mouse 2310 moves in that direction (e.g., activating wedge 2350).

Relative position controllers often have multiple buttons for activating different functions, such as mouse buttons 2312 and 2352. Some embodiments take advantage of this by assigning different top-level menus to different buttons. These embodiments display the menu associated with a particular button when that button is pressed. In some embodiments, a click-and-sweep operation requires clicking and holding a particular mouse button and moving the cursor with the mouse while holding that button. For example, a file menu and its submenus might be accessed by right-clicking and holding a mouse button (e.g., pushing down and holding down mouse button 2312) and moving the mouse 2310 while holding mouse button 2312, while a text formatting menu and its submenus might be accessed by left-clicking and holding mouse button 2352 and moving the mouse 2310 while holding the button.

B. Absolute Position Devices

Figure 24:
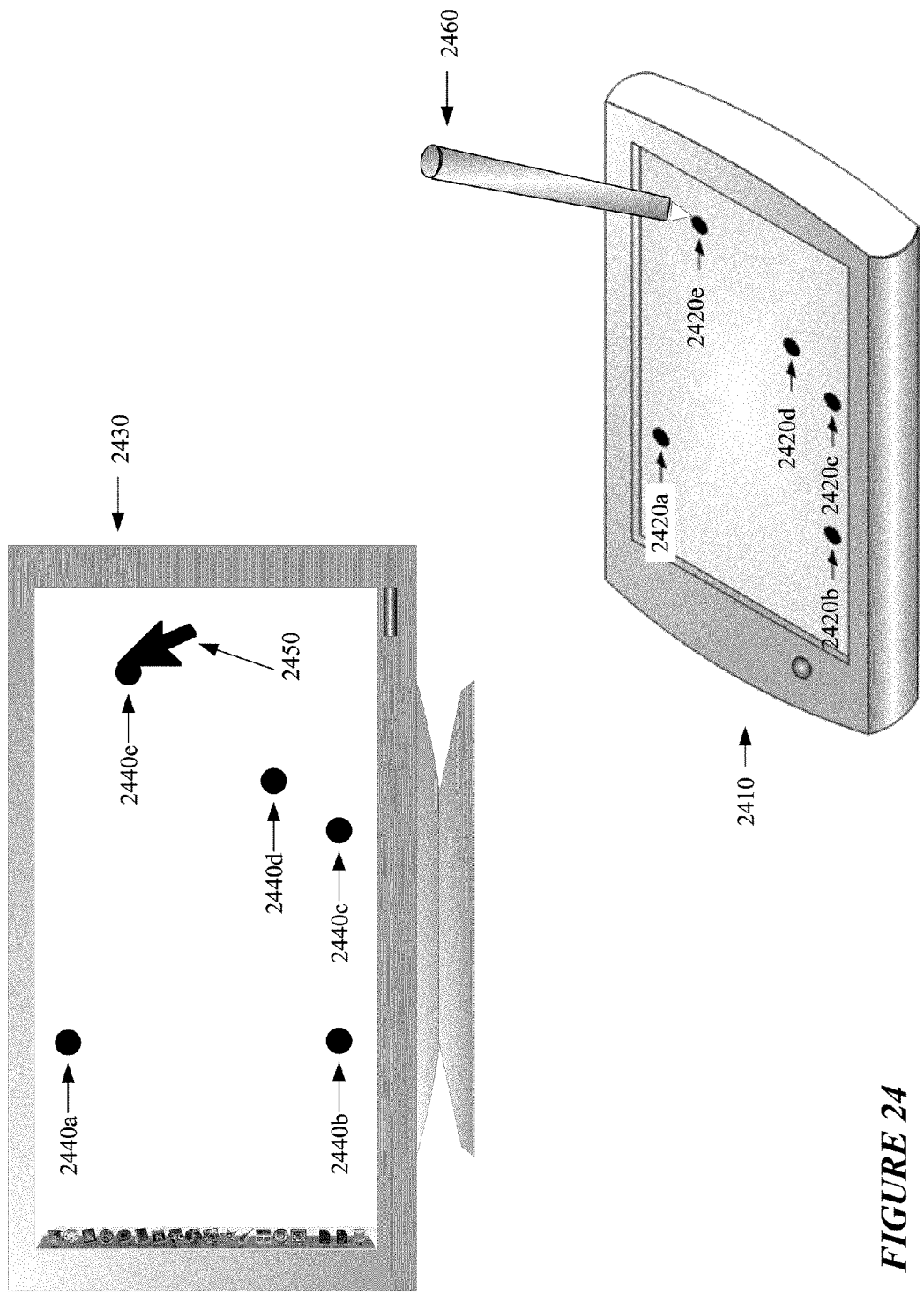
FIG. 24 illustrates a one-to-one correspondence between a graphics tablet and a display screen.

Some embodiments use absolute position cursor control devices, such as graphics tablets or touch screen devices. An absolute position device provides a one-to-one correspondence between a setting of the device and the location of the cursor on the screen. That is, commands that identify a position are sent to a computer rather than commands to change a position. For example, on a touch screen, touching a part of the screen directs the cursor to the location that was touched. FIG. 24 illustrates a one-to-one correspondence between locations on a graphics tablet 2410 and locations on a display screen 2430. The figure shows a number of locations 2420a-2420e on tablet 2410. The circles at locations 2420a-2420e are used to identify the locations in the figure for descriptive purposes, rather than representing physical objects or marks on the graphics tablet itself.

Touching the tablet's surface 2410 at locations 2420a-2420e would activate any GUI elements in screen 2415 at locations 2440a-2440e, respectively. Likewise, some embodiments display a cursor 2450 at the location on the screen 2415 corresponding to the location that the stylus 2460 is touching the touchpad. Some embodiments use a touch screen as a combination graphics tablet and display. In such embodiments, the cursor will be displayed at the actual location on the display that the stylus or finger is touching.

One difference in the processes of using a mouse and using a graphics tablet is that the direction of the motion of the stylus 2460 or finger on the graphics tablet 2410 is derived from successive positions of the finger or stylus 2460 over time, rather than calculated from motion signals as was the case for the mouse.

Figure 25:
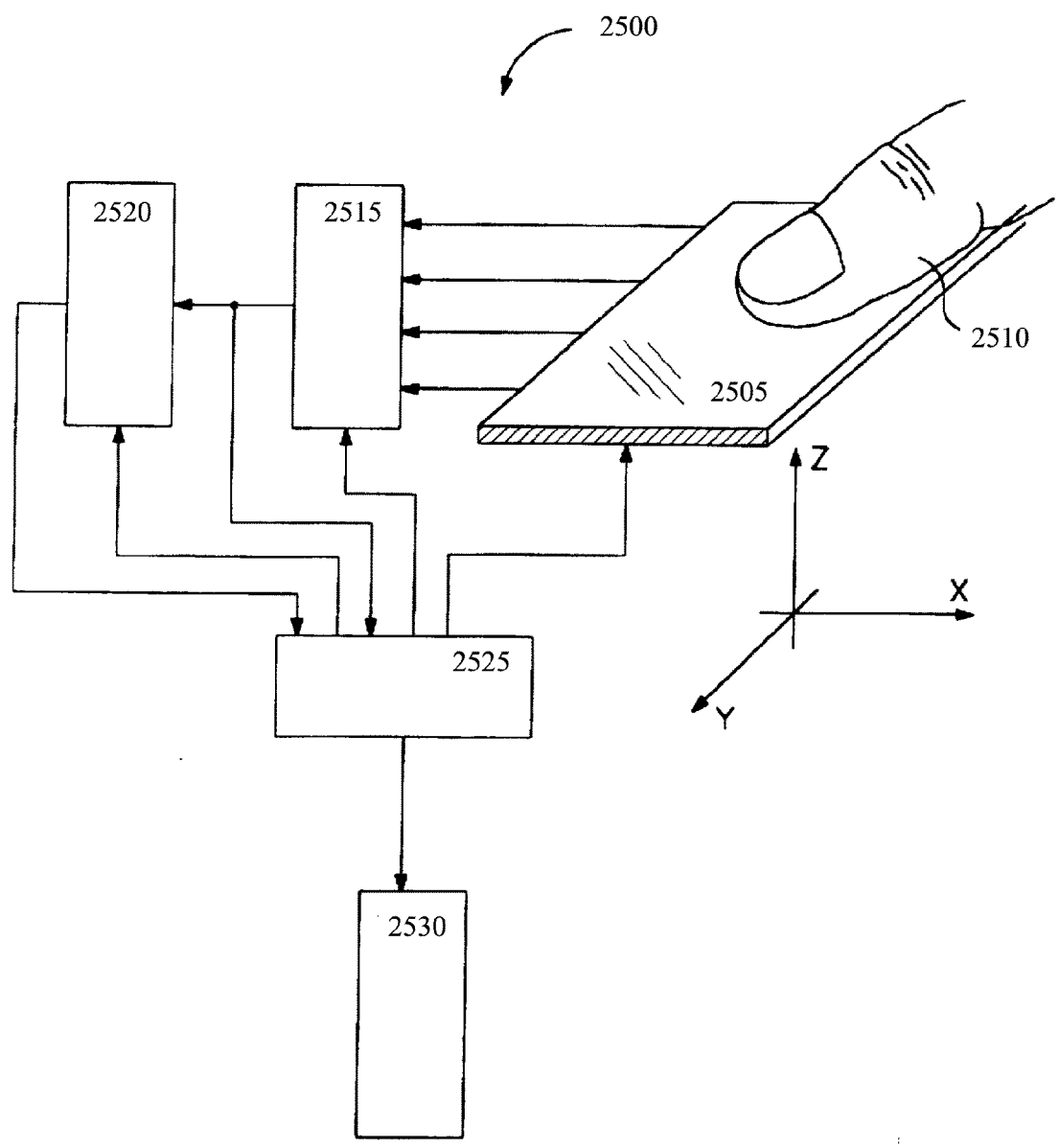
FIG. 25 presents one embodiment of a touch-sensitive input device that may be utilized to implement the present invention.

FIG. 25 presents one embodiment of a touch-sensitive input device that may be utilized to implement the present invention. For some embodiments, touch-sensitive cursor-controlling input device 2500 is a graphics tablet (not drawn to scale). Graphics tablet 2500 includes virtual electrode pad 2505, electrical balance measurement circuit 2515, balance ratio determination circuit 2520, and microcontroller 2525. For some embodiments, virtual electrode pad 2505 is in the shape of a rectangular sheet. It is capable of forming "virtual electrodes" at various positions on its top and bottom surfaces. These electrodes are denoted as "virtual electrodes" since separate conductive strips on the two sides of pad 2505 are used to form single elements denoted as "virtual electrodes." The virtual electrodes are connected to electronic circuitry capable of measuring the electrical balance between selected top and bottom virtual electrodes.

Balance ratio determination circuit 2520 determines the ratio of one balance measurement to another. Microcontroller 2525 selects appropriate electrodes for balance measurement and ratio determination. Microcontroller 2525 also responds to balance ratios to calculate position information of the sensed object (e.g., finger 2510). This information may include positional data along one axis or two axes parallel to the electrode pad surface (e.g., along the x and y axes). Additional "proximity" information along an axis perpendicular to the surface of electrode pad 2505 (e.g., along the z-axis) may also be determined from an appropriate balance measurement. Position information determined by microcontroller 2525 is provided to a utilization means 2530, which may be any of a variety of electronic or computer devices (such as computer 2314).

Consequently, graphics tablet 2500 generates x, y, and z data pertaining to the user's contact with the graphics tablet (e.g., pertaining to the position of the operator's finger on the graphics tablet) over some region in the x, y and z directions. Velocities, accelerations, timing differentials, and signal strengths can be determined from this data string. As mentioned below, when these parameters are considered along with prior events, it is possible to discern between cursor manipulation, click, multi-click, drag, click-and-drag, and multi-click-and-drag operations. Additionally, raw x, y, and z data can be filtered to optimize the operation of the touch-sensitive input device as perceived by the user.

Since feedback to the user that an operation has been initiated or completed is important, feedback to the user is incorporated into some embodiments through the use of audio signals (e.g., various beeps, clicks, or customizable sounds issued through the computer's sound system) or video signals (e.g., a change in shape, color, or highlighting of the cursor, on-screen status indicator, etc.).

In some embodiments, the GUI of an application using an absolute position controller such as a graphics tablet may not show a cursor at all until a user touches the active surface of the tablet (e.g., with a stylus). When the user has touched the surface, the cursor appears at the location on the screen corresponding to the location on the tablet that the user touched.

In some embodiments, predicting where to display a menu when using an absolute position cursor control device includes predicting what location the control device will indicate when the location stops changing. A click and sweep operation on a graphics tablet involves touching part of an active surface of the tablet (e.g., with a finger or stylus) and stroking the surface. As the finger or stylus moves on the surface, it sends new positions for the cursor to the GUI.

Accordingly, predicting what location a graphics tablet will indicate means predicting where a stroking finger (or stylus, etc.) will stop touching the tablet.

In other embodiments, predicting where to display a menu includes predicting where a stylus or finger used to indicate the position will end up after leaving the controller. For a graphics tablet, this would mean assuming that the user's finger or stylus would keep moving after leaving the tablet and predicting what portion of the tablet the user's finger will be hovering over when the finger stops moving.

As described above, an application using a relative position controller can simply move the cursor to a new location on the screen and that new position will become the position from which future movement commands will apply. However, that is not the case for an absolute position controller. For example, if an application is using a graphics tablet, the position of the cursor on the screen is determined by the position of the user's stylus on the graphics tablet. Because of the absolute positioning system used by such controllers, any move of the cursor on the screen without a corresponding move of the user's stylus on the graphics tablet would break the one-to-one correspondence between the cursor's position on the screen and the location of the stylus. Accordingly, such applications cause the submenus to be displayed at the predicted or actual stopping point when that point is not too close to an edge. However, when the user moves the cursor too close to the edge, the applications cause a menu to be displayed as close to the cursor as possible and rely on the user to move the cursor to the menu.

VIII. Software Architecture

Figure 26:
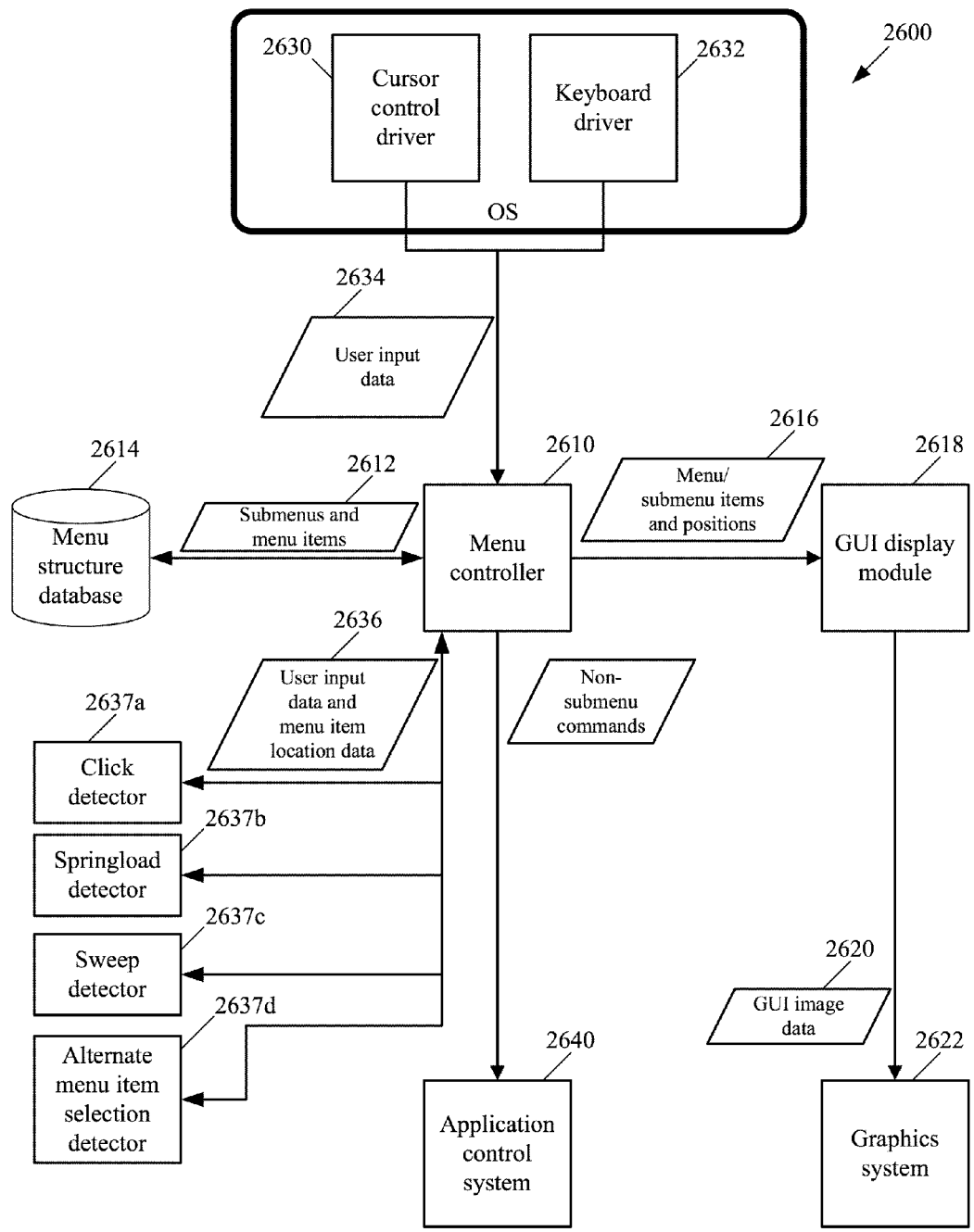
FIG. 26 conceptually illustrates the software architecture of an application that uses radial menus of some embodiments.

Some embodiments are implemented by computer programs (e.g., applications) executed on processors and stored on computer readable media with software modules. FIG. 26 conceptually illustrates the software architecture 2600 for an application that uses the menus of some embodiments. In some embodiments the application is an operating system, while in other embodiments the application is a stand-alone application or is integrated into another application. FIG. 26 illustrates a menu controller 2610, menu structure database 2614, GUI display module 2618, graphics system 2622, application control system 2640, detector modules 2637a-2637d, and drivers 2630 and 2632.

The menu controller 2610 receives data about menu and submenu items 2612 from a menu structure database 2614. The data 2612 can include information about what commands the menu items of a particular menu correspond to, such as commands to open submenus and non-submenu commands (e.g., a "Save" command). The data 2612 can also include information about the size and position of the menu items in a menu.

Using the data 2612, the menu controller 2610 provides visual displays of the menus to a user by sending data 2616 about menu and submenu items and the positions of menus and submenus to a GUI display module 2618. The GUI display module 2618 provides GUI image data 2620 to a graphics system 2622, which then provides a user with a display of the GUI, including any menu or submenu invoked by the menu controller. In some embodiments the graphics system 2622 is part of an operating system. In other embodiments, the graphics system is part of the application.

The user interacts with the menus using input devices (not shown). The input devices, such as cursor controllers and keyboards, send signals to the cursor controller driver 2630 and the keyboard driver 2632, which translate those signals into user input data 2634 that are then provided to the menu controller 2610.

The menu controller 2610 sends data 2636 (in some embodiments including the user input data and positions of the menu items of any menus open at the time) to detector modules 2637a-2637d that identify when a click, sweep, spring-load, or some other selection method has been used to select a menu item of the current menu. In the illustrated embodiment, the modules that identify cursor commands are part of the application (or operating system) that uses radial menus. However, in some embodiments, an operating system or drivers of the operating system identify the cursor commands and pass that data on to the application. For example, in some embodiments, the direction of a sweep command is determined by the operating system, by drivers of the operating system, or by hardware or software in the cursor control device.

When a menu item is selected, it could either be a menu item that corresponds to a submenu or a menu item that corresponds to a non-submenu command. If the selected menu item corresponds to a submenu, then the menu controller 2610 opens the submenu at an appropriate location (as described earlier in this specification) and passes this information to the GUI display module. If the menu item selected corresponds to a non-submenu command (e.g., print current page), then the menu controller 2610 sends the non-submenu command to the control system 2640 of the application. The control system 2640 then executes the selected command.

While many of the features have been described as being performed by one module (e.g., the menu controller #3310), one of ordinary skill would recognize that the functions might be split up into multiple modules, and the performance of one feature might even require multiple modules.

IX. Computer System

Figure 27:
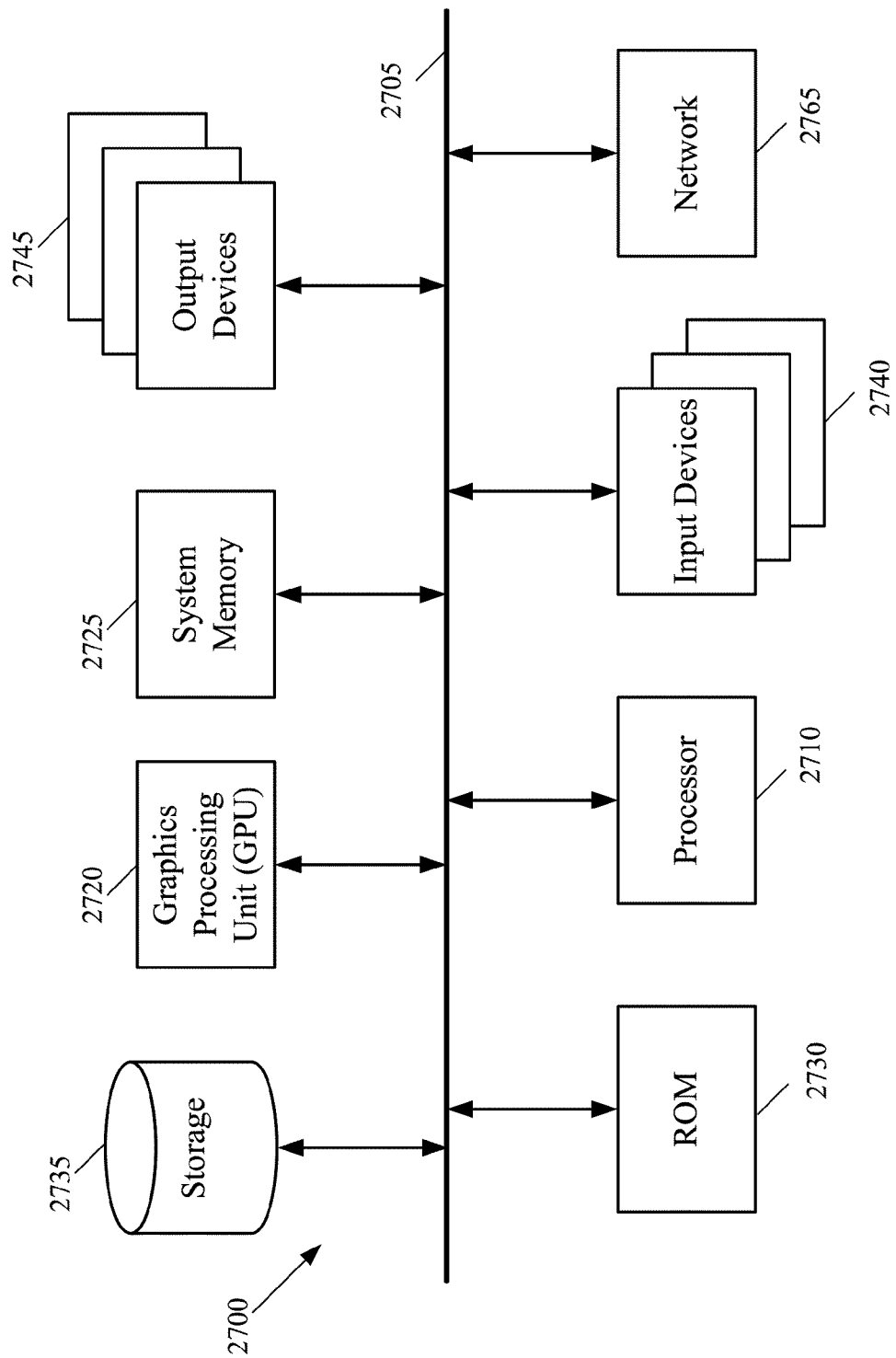
FIG. 27 illustrates a computer system with which some embodiments of the invention are implemented.

Computer programs for implementing some embodiments are executed on computer systems. FIG. 27 illustrates a computer system with which some embodiments of the invention are implemented, such a computer system includes various types of computer readable mediums and interfaces for various other types of computer readable mediums. Computer system 2700 includes a bus 2705, a processor 2710, a graphics processing unit (GPU) 2720, a system memory 2725, a read-only memory 2730, a permanent storage device 2735, input devices 2740, and output devices 2745.

The bus 2705 collectively represents all system, peripheral, and chipset buses that communicatively connect the numerous internal devices of the computer system 2700. For instance, the bus 2705 communicatively connects the processor 2710 with the read-only memory 2730, the GPU 2720, the system memory 2725, and the permanent storage device 2735.

From these various memory units, the processor 2710 retrieves instructions to execute and data to process in order to execute the processes of the invention. Some instructions are passed to and executed by the GPU 2720. The GPU 2720 can offload various computations or complement the image processing provided by the processor 2710. In some embodiments, such functionality can be provided using CoreImage's kernel shading language.

The read-only-memory (ROM) 2730 stores static data and instructions that are needed by the processor 2710 and other modules of the computer system. The permanent storage device 2735, on the other hand, is a read-and-write memory device. This device is a non-volatile memory unit that stores instructions and data even when the computer system 2700 is off. Some embodiments of the invention use a mass-storage device (such as a magnetic or optical disk and its corresponding disk drive) as the permanent storage device 2735.

Other embodiments use a removable storage device (such as a floppy disk, flash drive, or ZIP® disk, and its corresponding disk drive) as the permanent storage device. Like the permanent storage device 2735, the system memory 2725 is a read-and-write memory device. However, unlike storage device 2735, the system memory is a volatile read-and-write memory, such a random access memory. The system memory stores some of the instructions and data that the processor needs at runtime. In some embodiments, the invention's processes are stored in the system memory 2725, the permanent storage device 2735, and/or the read-only memory 2730.

The bus 2705 also connects to the input and output devices 2740 and 2745. The input devices enable the user to communicate information and select commands to the computer system. The input devices 2740 include alphanumeric keyboards and pointing devices (also called "cursor control devices"). The output devices 2745 display images generated by the computer system. For instance, these devices display a GUI. The output devices include printers and display devices, such as cathode ray tubes (CRT) or liquid crystal displays (LCD).

Finally, as shown in FIG. 27, bus 2705 also couples computer 2700 to a network 2765 through a network adapter (not shown). In this manner, the computer can be a part of a network of computers (such as a local area network ("LAN"), a wide area network ("WAN"), or an Intranet, or a network of networks, such as the internet. For example, the computer 2700 may be coupled to a web server (network 2765) so that a web browser executing on the computer 2700 can interact with the web server as a user interacts with a GUI that operates in the web browser.

Any or all components of computer system 2700 may be used in conjunction with the invention. For instance, in some embodiments the execution of the frames of the rendering is performed by the GPU 2720 instead of the CPU 2710. Similarly, other image editing functions can be offloaded to the GPU 2720 where they are executed before the results are passed back into memory or the processor 2710. However, a common limitation of the GPU 2720 is the number of instructions that the GPU 2720 is able to store and process at any given time. Therefore, some embodiments adapt instructions for implementing processes so that these processes fit onto the instruction buffer of the GPU 2720 for execution locally on the GPU 2720. Additionally, some GPUs 2720 do not contain sufficient processing resources to execute the processes of some embodiments and therefore the CPU 2710 executes the instructions. One of ordinary skill in the art would appreciate that any other system configuration may also be used in conjunction with the present invention.

As mentioned above, the computer system 2700 may include any one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, and floppy disks.

While the invention has been described with reference to numerous specific details, one of ordinary skill in the art will recognize that the invention can be embodied in other specific forms without departing from the spirit of the invention. For example, while many of the features described herein are described in the context of radial menus, many of these features can be applied to any radial structure in a GUI (e.g., a radial file folder system). Further, many of the features are applicable to radial hierarchical menus that are not round (e.g., menus that are square instead of round). Similarly, while the embodiments above are described in terms of radial menus, the features can be applied to any other display area in a GUI. Displayed GUI objects may sometimes be referred to as display areas.

Some of the described embodiments have been described in reference to particular devices, such as a graphics tablet or a touch sensitive screen. Features of some embodiments described as relating to one or the other apply to embodiments of either one. Similarly, features of embodiments described in terms of a mouse may apply to embodiments using touchpads.

Some of the described embodiments refer to "submenus" or "menus". However in some embodiments, features described as applying to menus may apply to submenus and features described as applying to menus may apply to submenus. For example, descriptions that include moving submenus can apply to moving menus and descriptions that include moving menus can apply to moving submenus, Similarly, the term window as used in the specification can include windows that occupy a full screen, and windows without visible borders. In some descriptions of the illustrated embodiments, the term "screen" is used without the term "window", however features described in terms of screens may apply to windows in some embodiments. Thus, one of ordinary skill in the art would understand that the invention is not to be limited by the foregoing illustrative details, but rather is to be defined by the appended claims.

We claim:
1. A method comprising:
defining a first radial menu for display around a position indicator;
defining a second radial menu as a submenu of the first radial menu, the second radial menu for displaying at a particular location;
determining the particular location for the second radial menu by predicting a stopping location of the position indicator using direction and at least one additional parameter of the position indicator when the position indicator is moved from the center of the first radial menu in order to select a particular menu item of the first radial menu that corresponds to the second radial menu;
displaying the second radial menu at the predicted stopping location while the position indicator is moving; and
moving the second radial menu from the predicted stopping location to a final location where the movement of the position indicator stops.
2. The method of claim 1, wherein the first radial menu comprises a first plurality of selectable GUI items for arranging radially around the position indicator and the submenu comprises a second plurality of selectable GUI items for arranging radially around the particular location.

3. The method of claim 1, wherein the predicting the stopping location of the position indicator is performed by an operating system.

4. The method of claim 1, wherein the predicting the stopping location of the position indicator is performed by an application that runs on top of an operating system.

5. The method of claim 1, wherein the additional parameter comprises at least one of speed and acceleration of the position indicator.

6. The method of claim 1, wherein the additional parameters comprise both speed and acceleration of the position indicator as the position indicator moves from the center of the menu out of the menu.

7. The method of claim 1 further comprising identifying the position indicator having been located over the particular selectable item for a time exceeding a preset duration, and performing a function corresponding to the particular selectable item in response to the function when the position indicator being located over the particular selectable item for the time exceeding the preset duration.

8. The method of claim 1 further comprising receiving an activation command for displaying the first radial menu.

9. The method of claim 8, wherein the activation command comprises a signal that a stylus has contacted a surface.

10. The method of claim 8, wherein the activation command comprises a signal that a mouse button has been pressed.

11. A non-transitory computer readable medium storing a computer program for execution by at least one processing unit, the computer program comprising sets of instructions for:
displaying a first graphical user interface (GUI) object comprising a plurality of selectable GUI items arranged radially around a position indicator, each of the selectable GUI items being associated with a set of angles from a center point of the first GUI object;
detecting a movement of the position indicator;
as the position indicator moves out of the GUI object at a particular angle associated with a particular one of the selectable GUI items, determining an expected location at which the position indicator is predicted to stop moving, before the movement stops, based on the direction and at least one additional parameter of the position indicator;
displaying, at the expected location, a second GUI object corresponding to the particular selectable GUI item; and
moving the second GUI object from the expected location to a location where the movement actually stops.

12. The non-transitory computer readable medium of claim 11, wherein the computer program further comprises a set of instructions for identifying the position indicator having been located over the particular selectable item for a time exceeding a preset duration, wherein the set of instructions for performing a function corresponding to the particular selectable item is also for performing the function when the position indicator has been identified as being located over the particular selectable item for the time exceeding the preset duration.

13. The non-transitory computer readable medium of claim 11, wherein the plurality of selectable GUI items corresponds to a plurality of functions, the computer program further comprising a set of instructions for displaying a submenu when a selectable GUI item corresponding to a function to display the submenu is selected.

14. The non-transitory computer readable medium of claim 11, wherein the one additional parameter is one of (i) speed and (ii) acceleration of the position indicator as the position indicator moves out of the GUI object.

15. The non-transitory computer readable medium of claim 11, wherein the movement of the position indicator is determined by a movement of a stylus on a surface and the expected location is determined based at least partly on a pressure of the stylus on the surface.

16. The non-transitory computer readable medium of claim 15, wherein the surface is a graphics tablet.

17. The non-transitory computer readable medium of claim 15, wherein the surface is a touch sensitive display.

18. The non-transitory computer readable medium of claim 11, wherein the second GUI object comprises a second plurality of selectable GUI items arranged radially around the expected location, the computer program further comprising sets of instructions for:
detecting an outward motion of the position indicator from the center of the second GUI object;
correlating the outward motion to a second selectable GUI item from the second plurality of selectable GUI items; and
performing a function associated with the selected GUI item.

19. The non-transitory computer readable medium of claim 11, wherein the set of instructions for correlating the outward motion to the second selectable item comprises a set of instructions for identifying a direction of the outward motion.

20. The non-transitory computer readable medium of claim 11, the set of instructions further comprising receiving an activation command to display the first GUI object.

21. The non-transitory computer readable medium of claim 20, wherein the activation command comprises a signal that a stylus has contacted a surface.

22. The non-transitory computer readable medium of claim 20, wherein the activation command comprises a signal that a mouse button has been pressed.

23. A computer system, comprising:
a display device;
a processor;
a storage device comprising instructions, which when executed by the processor, configure the processor to perform operations comprising:
displaying, on the display device, a first graphical user interface (GUI) object comprising a plurality of selectable GUI items arranged radially around a position indicator, each of the selectable GUI items being associated with a set of angles from a center point of the first GUI object;
detecting a movement of the position indicator;
as the position indicator moves out of the GUI object at a particular angle associated with a particular one of the selectable GUI items, determining an expected location on the display device at which the position indicator is predicted to stop moving, before the movement stops, based on the direction and at least one additional parameter of the position indicator;
displaying, at the expected location on the display device, a second GUI object corresponding to the particular selectable GUI item; and
moving the second GUI object from the expected location on the display device to a location where the movement actually stops.

24. The computer system of claim 23, wherein the one additional parameter is one of (i) speed and (ii) acceleration of the position indicator as the position indicator moves out of the GUI object.

25. The computer system of claim 23, wherein the movement of the position indicator is determined by a movement of a stylus on a surface of the display device and the expected location is determined based at least partly on a pressure of the stylus on the surface of the display device.

26. The computer system of claim 25, wherein the surface of the display device is a graphics tablet.

27. The computer system of claim 25, wherein the surface of the display device is a touch sensitive display.

28. The computer system of claim 23, wherein the second GUI object comprises a second plurality of selectable GUI items arranged radially around the expected location, and wherein the processor is further configured to perform operations comprising:
  detecting an outward motion of the position indicator from the center of the second GUI object;
  correlating the outward motion to a second selectable GUI item from the second plurality of selectable GUI items; and
  performing a function associated with the selected GUI item.

29. The computer system of claim 23, wherein correlating the outward motion to the second selectable item comprises identifying a direction of the outward motion.

30. The computer system of claim 23, the processor further causing the user interface to perform operations comprising receiving an activation command to display the first GUI object.

31. The computer system of claim 30, wherein the activation command comprises a signal that a stylus has contacted a surface of the display device.

32. The computer system of claim 30, wherein the activation command comprises a signal that a mouse button has been pressed.

* * * * *